United States Patent [19]
Hopkins et al.

[11] Patent Number: 5,097,861
[45] Date of Patent: Mar. 24, 1992

[54] IRRIGATION METHOD AND CONTROL SYSTEM

[75] Inventors: Larry K. Hopkins, Escondido; Jesse W. Loden, San Diego; Paul M. Hunter, Encinitas, all of Calif.

[73] Assignee: Hunter Industries, San Marcos, Calif.

[21] Appl. No.: 241,930

[22] Filed: Sep. 8, 1988

[51] Int. Cl.⁵ ............................................. F16K 17/36
[52] U.S. Cl. .................................... 137/78.3; 239/63; 239/69
[58] Field of Search .................. 239/63, 69; 137/78.3

[56] References Cited

U.S. PATENT DOCUMENTS

| | | | |
|---|---|---|---|
| 4,176,395 | 11/1979 | Evelyn-Veere et al. | 239/69 |
| 4,209,131 | 6/1980 | Barash et al. | 239/69 |
| 4,569,020 | 2/1986 | Snoddy et al. | 364/420 |

OTHER PUBLICATIONS

Weathermatic Controller, Sprinkler Divison Telsco Industries, four page brochure, (undated).
Hardie Irrigation, HR6200 Controller, one page, (undated).
Irri-Trol, MC PMS Controller, two page brochure, (undated).
Hardie Irrigation, HR6100 Controller, two page brochure, (undated).
Rain Master Direct Dial, two page brochure, (undated).

Primary Examiner—A. Michael Chambers
Attorney, Agent, or Firm—Baker, Maxham, Jester & Meador

[57] ABSTRACT

A plurality of selectively actuable watering stations are spaced about a selected location such as a lawn and/or garden and are connected to a source of pressurized water. A set of data is stored representing environmental conditions of the selected location, said conditions being selected from the group consisting of evapotranspiration rates for predetermined intervals throughout a given time period, and temperature precipitation rates for predetermined intervals throughout a given time period. Another set of data is provided from at least one input device at the selected location, the input device being selected from the group consisting of a temperature sensor, a rain gauge, a hummidity sensor, and a flow meter. Each watering station is actuated for predetermined durations at predetermined intervals based upon the data representing environmental conditions and the input device data to thereby ensure optimum growth of the plants situated in the selected location. A non-watering period may be designated for each of the watering stations to thereby determine an available watering period for each of the watering stations. Each watering station is thereafter only actuated within its corresponding available watering period.

37 Claims, 46 Drawing Sheets

INITIAL SETUP MENU

| LAST MENU | MON | TUE | WED | THU | FRI | SAT | SUN | TIME | DATE | ZIPCODE |
|---|---|---|---|---|---|---|---|---|---|---|
| | TIMES NOT TO WATER | | | | | | | 12:59 pm | 10/25/88 | 92069 |
| SET | FROM | TO | FROM | TO | | | | FROM | TO | |
| CLEAR | 11:00 am | 11:15 am | 11:30 am | 11:40 am | | | | | | |
| | 6:00 pm | 8:30 pm | | | | | | | | |

| INITIAL SETUP | DISPLAY/SET STATION | MANUAL OPERATION | DISPLAY WATER HISTORY | DISPLAY SCHEDULE | DISABLE ALL STATIONS |
|---|---|---|---|---|---|
| STATION 1 2 3 4 5 6 7 8 9 10 11 12 13 14 15 16 | | | | ▓ = INACTIVE | |
| ET = 0.15 in. | TUESDAY, JULY 5, 1988 10:54 a.m. | | | TEMP = 74 F | |
| NEXT RUNTIME = STATION 10 AT 11:30 A.M. FOR 2 HR. 30 MIN . | | | | | |

TOP LEVEL MENU

FIG. 3

STATION MENU

| 4 STATION | | PRECIP RATE | VARIANCE | SOIL INTAKE | TYPE | MODE |
|---|---|---|---|---|---|---|
| | | .54 IN/HR | + 10% | 0.50 IN/HR | WARM TURF | AUTO |
| | | MON – 4:45 A.M. (2.5 HR)   MON – 12:30 PM (8.5 HR) | | | | |
| | | WED –11:30 PM (0.5 HR) | | | | |
| | | FRI – 3:30 AM (1.5 HR) | | | | |
| | | SUN –11:45 AM (2.0 HR) | | | | |

| INITIAL SETUP | DISPLAY/SET STATION | MANUAL OPERATION | DISPLAY WATER HISTORY | DISPLAY SCHEDULE | DISABLE ALL STATIONS |
|---|---|---|---|---|---|
| STATION 1 2 3 4 ⬚5 6 7 8 ⬚9 10 11 12 ⬚13 ⬚14 ⬚15 ⬚16 | | | | | ⬚=INACTIVE |
| ET=0.15 IN. | TUESDAY, JULY 5, 1988 10:54 A.M. | | | TEMP=74 F | |
| NEXT RUNTIME=STATION 10 AT 11:30 A.M. FOR 2 HR. 30 MIN. | | | | | |

TOP LEVEL MENU

FIG. 4

INITIAL SETUP MENU

| LAST MENU | STATION | START | STOP | RUN TIME | MODE |
|---|---|---|---|---|---|
|  |  |  |  | 1 hr 30 min—0.37 in | MANUAL |
| 1 2 [3] 4 5 6 [7] 8 9 [10] 11 12 13 14 15 16 ||||||
| STATION 3 ON FOR 1 HR 25 MIN ||||||

| INITIAL SETUP | DISPLAY/SET STATION | MANUAL OPERATION | DISPLAY WATER HISTORY | DISPLAY SCHEDULE | DISABLE ALL STATIONS |
|---|---|---|---|---|---|
| STATION 1 2 3 4 [5] 6 7 8 [9] 10 11 12 [13] [14] [15] [16]  [ ] = INACTIVE ||||||
| ET = 0.15 in. | TUESDAY, JULY 5, 1988 10:54 a.m. |||| TEMP = 74 F |
| NEXT RUNTIME = STATION 10 AT 11:30 A.M. FOR 2 HR. 30 MIN. ||||||

TOP LEVEL MENU

*FIG. 5*

IRRIGATION METHOD AND CONTROL SYSTEM

BACKGROUND OF THE INVENTION

The present invention relates to irrigation, and more particularly, to an improved irrigation method and an improved electronic irrigation control system which is easier to program and more flexible than prior irrigation control systems.

Most existing lawn and garden irrigation control systems depend on "programs" which are set up by the user to initiate watering times at a particular valve station at a certain time of day. The length of the watering cycle or run time must somehow be calculated by the user and entered into the controller program for each station. This may involve calculating two or more start times per station per day. This process is often complicated by confusing and cumbersome controller keyboards and entry switches. Even the most sophisticated solid state controllers have several switches and indicators which often have multiple functions assigned to them.

SUMMARY OF THE INVENTION

It is therefore the primary object of the present invention to provide an improved irrigation control system particularly suited for lawn and garden environments.

The present invention eliminates both the concept of user run time calculations and awkward controller entry switches. The user simply enters the times when the system is not supposed to water and the control system calculates the necessary water schedule based upon parameters previously entered by the user. The present invention operates on the premise that if enough environmental and geographical data is known about the installation site, then accurate watering schedules can be calculated. Soil moisture sensors are not needed to satisfy the water requirements for most turf and plant materials.

According to the present invention, the user must enter parameters which define the installation site characteristics. In the preferred embodiment, these are entered and reviewed by a combination of a single rotary switch and liquid crystal display (LCD). No other operator entry devices are required to completely set up and use the control system. Once the system parameters are entered they become part of the permanent system data tables which are retained even if AC power is lost, without the need for user accessible batteries.

As mentioned above, in the preferred embodiment the human interface for entering and displaying system information is based on a graphics display and a single entry switch which is both rotated and pressed to select various items. The LCD presents menus that include graphic images (ICONS) and overlaid text. The use of both text and graphic ICONS in each menu presentation avoids confusion and clarifies the data entry and retrieval process.

In the preferred embodiment the user is presented a hierarchy of menu structures on the LCD from which he or she can completely set up, modify and interrogate the control system. The menu structures are presented in a way which guides the user from the top menu through the sub-menus. As the rotary switch is turned, a selection bar is moved to the next highlighted menu item on the display. The user then selects or "picks" highlighted items from the menu by pressing the entry knob. As the switch is turned a cursor-bar moves across the menu from item to item in a continuous loop from left to right and top to bottom until a selection is made. If the item picked is to be changed, rotating the switch will allow the user to view the changes on the LCD display. When the desired change is achieved, pushing the switch button will enter the parameters. One menu select item in each sub-menu, has the capability of returning to the previous menu level.

A system status line is reserved on most menu levels in the preferred embodiment to show current system information to the user. Status information consists of items such as: active stations, next scheduled run time, calculated length of run time, time of day, error messages, etc.

The preferred embodiment of the control system uses information stored in ROM data tables in conjunction with daily temperature, rainfall and variables entered by the user to calculate and manage the watering schedules. The stored data tables contain information about monthly mean temperature and evapotranspiration rates (E.T.) for each section of the United States and Canada. The data tables actually contain twelve values of E.T. or temperature per ZIP Code area. This data when used with the user supplied variables such as grass type, soil intake rate, station's precipitation rate and time "not to water," is used by the control system to calculate water schedules for each output station.

As mentioned above, water schedule calculations in the preferred embodiment are based on stored constants in ROM tables in conjunction with user supplied variables which also become part of the permanent data base. The E.T. and temperature information contained in the ROM data tables are data which has been collected by agencies like CIMIS. This E.T. and temperature data represents the "mean monthly value" for each ZIP Code in the United States (twelve values per ZIP Code). The "Daily Value" for E.T. or temperature is derived from the mean monthly values by applying a "mathematical spline" or smoothing algorithm run across a previous, present and next-month basis. The resulting daily values have drastic variations and aberrations filtered out.

To complete the required data base information in the preferred embodiment, the user has the responsibility of providing the station's precipitation rate (inches per hour), soil intake (inches per hour) and the grass coefficient (multiplier factor of 0.6 to 1). This is required only once during initial installation and setup of the control system. Because of the extensive data base, the control system has the ability to react to excessive temperature changes or rainfall that may occur at the installation site. A user "variance" menu input item is also provided to allow for unique plant types or special growing zones.

The ZIP Code and each station's precipitation rate must be entered by the user for the preferred embodiment of the control system to operate properly for the specific location at which the control system is to be used and the field water requirements. All other inputs may have default values and, if used properly, they will allow for considerable watering accuracy.

In the preferred embodiment the control system includes a microprocessor and a time of day clock with a nonvolatile memory. The clock and nonvolatile memory contents are used for almost all calculations associated with water scheduling, so these devices are periodically checked for proper operation by the operating system software.

BRIEF DESCRIPTION OF THE DRAWINGS

FIG. 3 illustrates examples of the initial setup and top level menus which are displayed by the preferred embodiment;

FIG. 4 illustrates examples of the station and top level menus displayed by the preferred embodiment during station editing;

FIG. 5 illustrates examples of the manual operation and top level menus displayed by the preferred embodiment during manual operation;

DESCRIPTION OF THE PREFERRED EMBODIMENT

Figure 1:
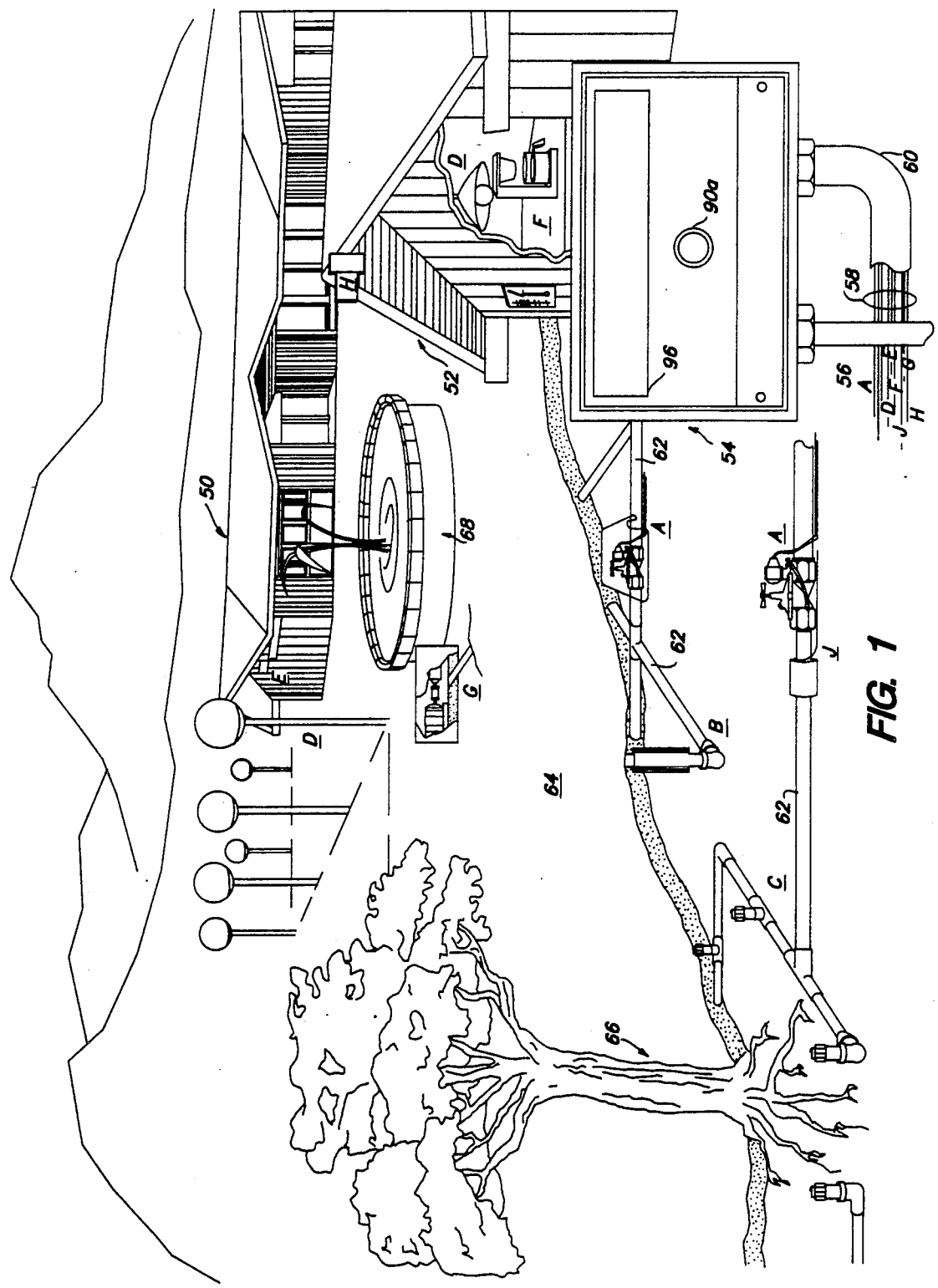
FIG. 1 is a diagrammatic view of a typical layout of lawn and garden input and output devices which may be connected to a preferred embodiment of our irrigation control system illustrated in elevation in the lower right hand corner.

FIG. 1 illustrates a representative layout of a plurality of possible lawn and garden input and output devices labeled A through J surrounding a residential home 50 and detached garage 52. They may be connected to a preferred embodiment of our control system which includes a rectangular control box or panel 54 which may be mounted to a pedestal or the wall inside the garage. Standard household AC power is supplied to the control system via cable or cord 56. Communication between those of the devices A-J which are electrical and the control system is provided via dedicated wires 58 which are buried throughout the yard and extend along the wall of the garage, entering the underside of the control panel 54 via conduit 60.

Referring still to FIG. 1, the watering portion of the output devices may include conventional electromechanically operated valves A which control the flow of water to sprinklers B and drip emitters C. These components are connected in the usual fashion by underground polyvinylchloride (PVC) or ABS (Trademark) plastic pipe 62 to a source of pressurized water (not illustrated). The sprinklers B are generally located in the lawn area 64 while the drip emitters are generally located adjacent a tree such as 66, or adjacent shrubbery or flowers, etc. (not illustrated). The auxiliary portion of the output devices may include lights D, a house alarm E, appliances F (e.g. coffee pot, stereo, etc.) and pumps G (e.g. in a fountain 68 or in a pool filter). The valves A, lights D, alarm E, appliances F and pumps G may all be activated and controlled via electrical output signals from the control system. The input devices may include a rain gauge H, a temperature gauge I, a flowmeter J, and a humidity sensor (not illustrated), all being conventional units producing electrical input signals that can be monitored by the control system. It should be understood that FIG. 1 is exemplary only that additional input and output devices may be added and configured in a variety of different ways depending upon the requirements of the location.

Figure 2:
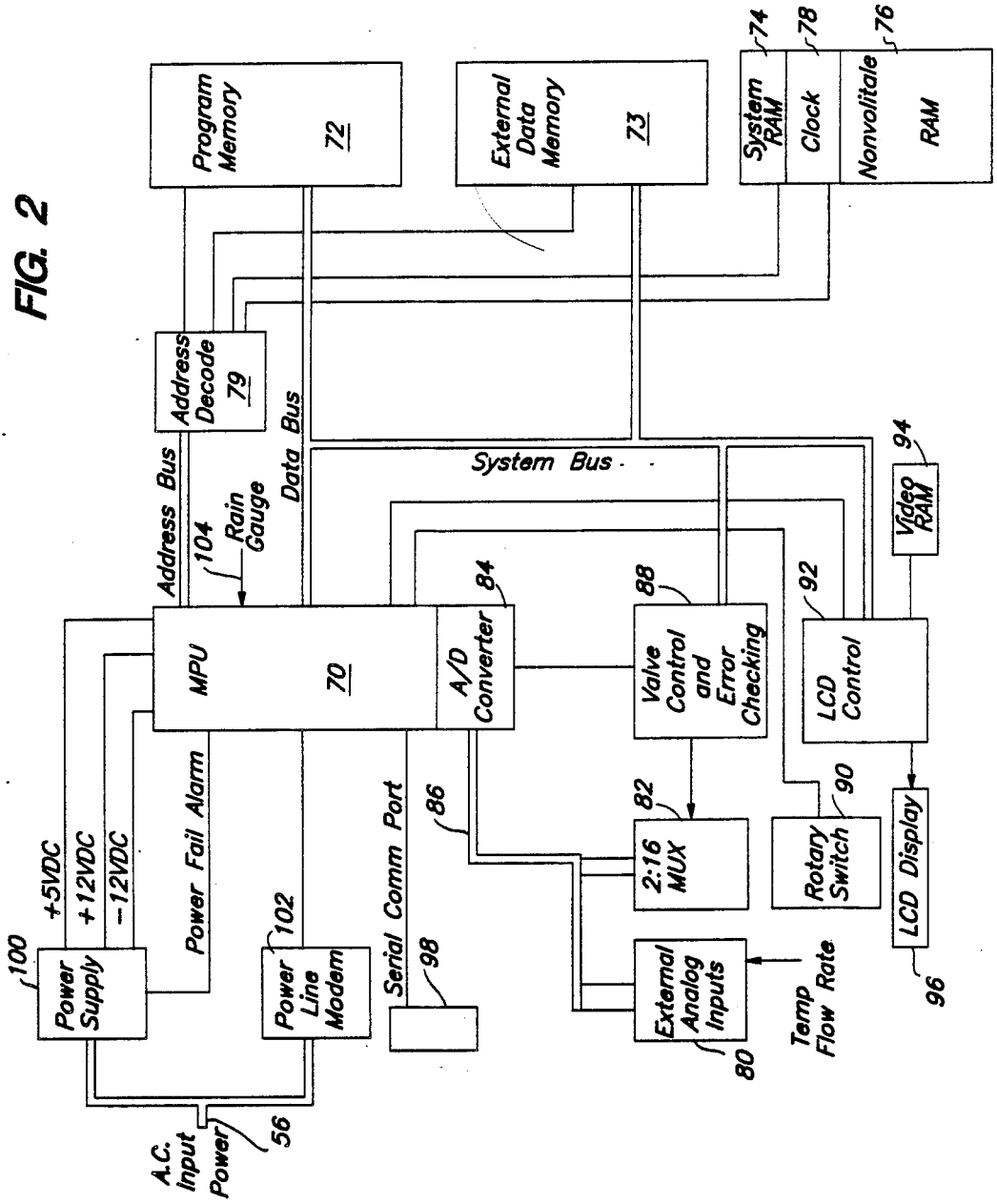
FIG. 2 is an overall block diagram of the preferred embodiment of our irrigation control system.

Referring to FIG. 2, the preferred embodiment of our control system is an intelligent microprocessor based system. It includes the following components which communicate on a bi-directional system bus: a microprocessor (MPU) 70, a program and data table memory (ROM) 72, an external data memory 73 and a system data random access memory (RAM) 74. The system further includes a special nonvolatile RAM memory 76 and a time of day clock 78. The MPU 70 communicates in a conventional manner with the memories 72, 73, 74 and 76 and the clock 78 via address data and system buses and an address decode circuit 79.

Various analog input signals are received via analog interface 80 (FIG. 2) and multiplexer (MUX) 82 which are connected to an analog to digital (A/D) converter 84 via analog line 86. The A/D converter 84 in turn communicates directly with the MPU 70. Valve control and error checking circuit 88 is connected to the A/D converter 84, the MUX 82 and the system bus. A rotary switch 90 enables the user to manually input commands directly to the MPU 70. An LCD control circuit 92 is connected directly to the MPU, to the system bus and to a video RAM memory 94 for driving an LCD display 96 to visually generate the menus hereafter described. A typical menu depicted by LCD 96 is illustrated in FIG. 1. The rotary switch 90 (FIG. 2) includes a knob 90a (FIG. 1) mounted in front of the panel 54 below the LCD display 96 for grasping and rotation by the user's hand.

An optional serial communications port 98 (FIG. 2) is connected to the MPU 70 for communication with external devices such as a personal computer (not illustrated). A power supply 100 is connected to the AC input power on cable 56 and drives the MPU 70 and associated devices with suitable DC voltages such as +5VDC, +12VDC and −12VDC. The power supply 100 preferably includes a conventional power fail detection circuit that provides alarm input to the MPU. A power line modem 102 may be connected to the MPU 70 so that it may communicate with similar systems connected to the same AC power line.

The MPU 70, as well as some of the peripheral functions labeled in FIG. 2, may be provided by a Siemens 80535 8 bit microprocessor unit with 256 bytes of on-chip RAM, six 8-bit ports, three 16 bit timers, serial port, eight channel 8-bit analog to digital converter and a 16 bit watch dog timer. The 80535 instruction set is compatible with the industry standard Intel 8051 MCU. The 80535 can address 64K bytes of program memory space and also 64K bytes of external data memory space. The 80535 may be used in an external program memory mode (with EA/tied low). In this mode, program code may be fetched from external PROM chips. The time of day clock and nonvolatile memory may occupy the upper most 2K bytes of external memory space.

The stored program and the data tables reside in nonvolatile read only memories 72 and 73 (FIG. 2). The program space size may be 64K bytes and can be used for storing the software for the MPU 70 as well as system data constants. The data tables reside in 64K bytes of data memory space. The data tables consist of compiled information about monthly mean temperature and evapotranspiration throughout the United States. This data is referenced against the measured daily temperature, rainfall readings, and user supplied parameters when watering schedules are calculated by the MPU.

The system RAM memory is preferably divided into two sections 74 and 76 (FIG. 2) which differ only in the fact that the upper 2K 76 bytes are nonvolatile or backed up during a power loss. This upper 2K bytes of RAM are therefore used for critical parameter storage. The data entered into this area includes items which affect the overall control actions such as the calculated run times for each station, history status information and user setup configuration, all of which must not be lost. The remaining lower RAM area 74 is used for general purpose software related calculations.

The time of day clock 78 is a hardware device which can be programmed to record and retrieve the current year, month, date, day of the week, as well as the hour, minute, and seconds of the day. The clock 78 communicates over a bi-directional bus with the MPU so that time dependent actions in the water management program are satisfied. Also the time of day is available for display to the user. The clock is protected against power loss so that it remains correct to the second during extended periods of power failure. The clock reading is periodically saved in the nonvolatile RAM 76 during normal control system operation. This is done to insure that chronologic events in the water management program can be maintained should primary power fail recovery be initiated. Both the time of day clock and the nonvolatile RAM 76 preferably have a self contained battery which does not require user replacement or service. Nonvolatile RAM 76 and clock 78 may be provided by a MOSTEK (Trademark) MK48T02B20 timekeeper chip.

The rain gauge H (FIG. 1) is a commercially available digital input device which can be set to measure a predetermined amount of collected rain water. Each input event from the rain gauge indicates that a certain amount of rain has fallen. The digital signals from the rain gauge are fed directly to the MPU 70 via line 104 (FIG. 2). If enough rain is collected in a specified time, the control system will either suspend or recalculate the water schedules.

The A/D converter 84 (FIG. 2) in conjunction with the MPU 70 allows the monitoring of external real world variables such as temperature or water flow rates. Since most natural events are not in digital format, these events must be translated or converted into a digital form which is compatible with the MPU. A temperature measurement device typically delivers a current or voltage which represents the air temperature. The illustrated embodiment of our control system has the ability to measure several external and internal analog events which are used as input variables to the water management software. Analog electric input signals from the thermometer I (FIG. 1) are fed via analog input circuit 80 (FIG. 2), lines 86 and A/D converter 84 to the MPU 70. The MPU uses the temperature input as a factor in calculating the sprinkler valve on time.

If the daily temperature exceeds a calculated reference temperature in the data base by a specified amount, the MPU will reschedule watering times to compensate for the excessive change. Also the electrical current flow at each valve A (FIG. 1) is monitored via the A/D converter 84 to check for valve failures or overloads. The water flow rate meter J (FIG. 1) is also monitored via the A/D converter.

The water flow rate provides information regarding the overall irrigation system performance. The control system has the capability to look at flow rate and determine irrigation cost items such as water usage per day or month, as well as noting an excessive flow rate resulting from a broken pipe or damaged sprinkler head.

The power fail detection circuit in the power supply 100 constantly monitors the AC input power to determine when main power loss is eminent. The circuit will detect power loss and interrupt the MPU. The MPU has approximately one second to save critical system information in the nonvolatile RAM 76. One item in particular that is saved is the time of day when the power loss occurred. Since the clock 78 is already protected from power loss, the system down time can be calculated upon recovery by comparing the clock reading with the saved time at power loss. This is very important since all run times may need recalculation if power is down for long periods of time. All other parameters set by the user such as station precipitation rates, times not to water, and ZIP Code are recovered after a power loss.

A software controlled 16 bit counter increments on each MPU machine cycle. The timer is disabled on power up and can only be started by software. Once the timer is started it cannot be stopped by software, however it can be reset to zero. It takes the counter approximately sixty-five milliseconds to overflow and cause an internal hardware reset. If this occurs, a flag is set so that the software can determine that a watchdog timeout error is present and possibly display the error status. The various software routines are preferably structured to insure that the sixty-five millisecond watchdog is cleared periodically. This limits software failure errors to no more than sixty-five milliseconds. This feature can also be used to help evaluate and correct problems in field installations.

The serial communications port 98 may be an integral part of the MPU, as in the case of the Siemens 80535 micro-controller unit. The serial port can operate in four modes which differ in the number of data and start/stop bits which are required. Variable baud rates can be generated using the internal timer of the 80535 micro-controller unit. This serial port allows the micro-controller unit to access external devices over the industry standard RS-232C type of interface.

Our control system has the capability of communicating with other similar control systems or compatible devices over the main AC power lines using the power line modem 102. The construction and operation of AC power line modems are well known and need not be further described here. One control system can be used as a "master" which can communicate with other "slave" control systems on the same AC power distribution line. In this way the user can interrogate several irrigation control systems from one master location. The control system can also use this port to communicate with various other devices which have the propriety power line modem interface. Devices such as valves, lights, alarms and appliances can be controlled remotely.

As previously described, data display and entry are accomplished via the LCD display 96 (FIG. 2) and the front panel rotary switch 90. The LCD display 96 is preferably a "dot matrix" type of unit which can display both graphics and text information in the form of letters and numerals. Up to eight rows of eighty character columns of text can be displayed. In graphics mode, the display consists of 480 picture elements (pixels) wide by 64 pixels high (480×64). Text and graphics modes can be mixed to create complex displays of symbols and graphs annotated with text. The LCD display is managed by the LCD control 92 which communicates with the MPU 70 over the bi-directional system bus. The LCD control 92 handles all display related tasks such as display refresh and video memory accesses and may be provided in the form of an HITACHI (Trademark) HD 61830 Graphic LCD controller (GLC).

Figure 6:
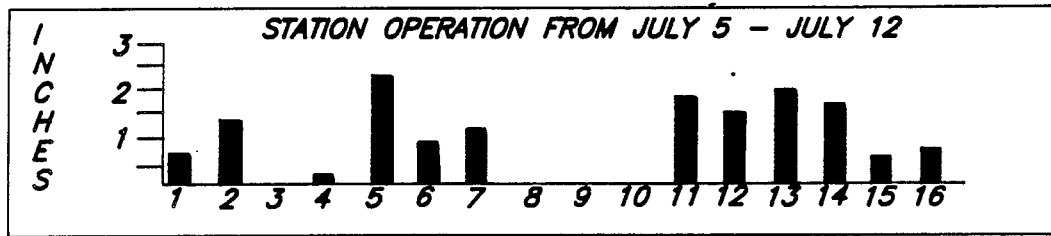
FIG. 6 illustrates examples of the water history and top level menus displayed by the preferred embodiment during station water application.
Figure 7:
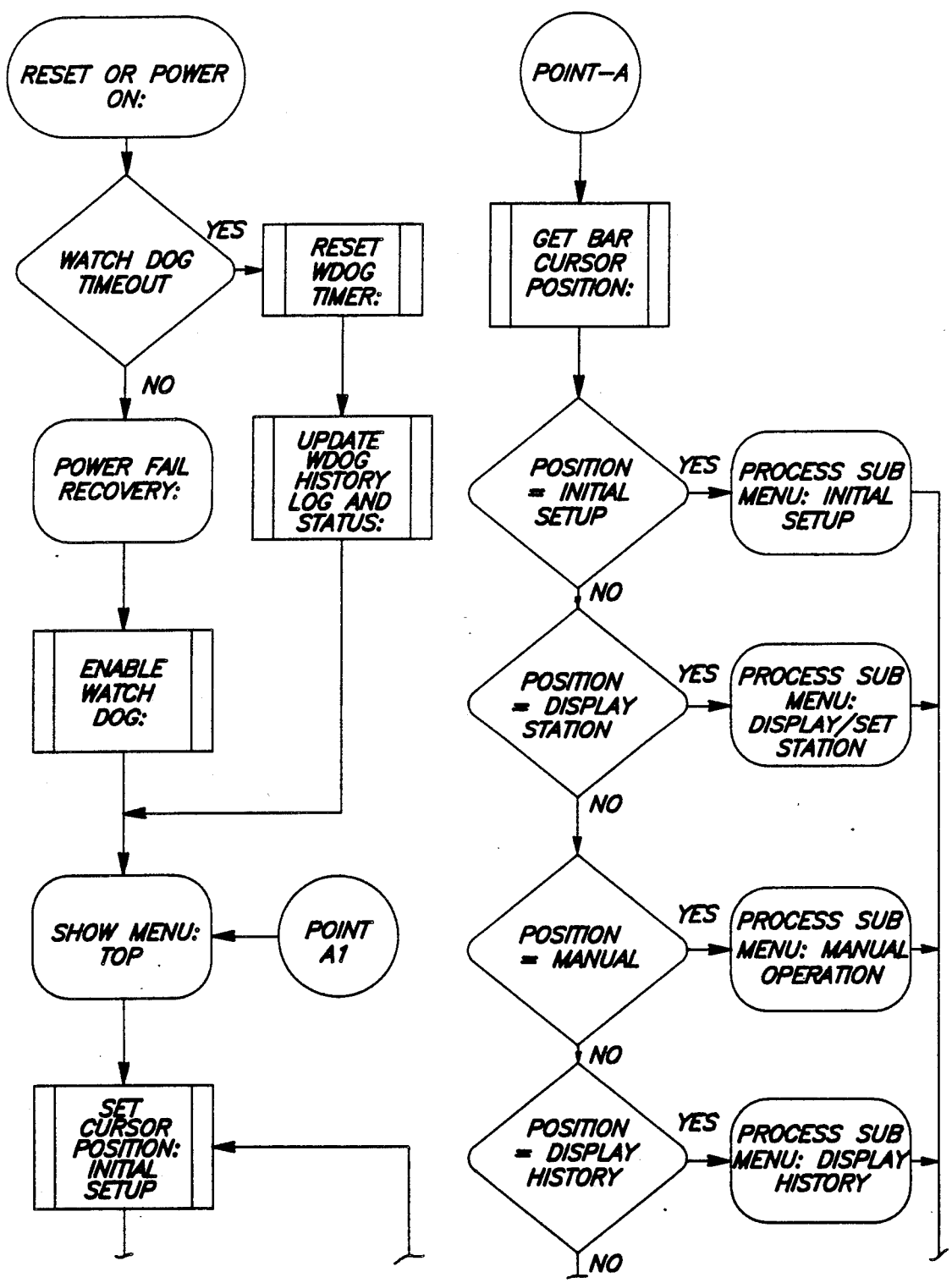
FIGS. 7 through 53 are a series of flow diagrams which together illustrate the logic performed by the preferred embodiment of our irrigation control system. Unconnected lines on individual figures connect to the corresponding unconnected lines of preceding or succeeding figures.
Figure 8:
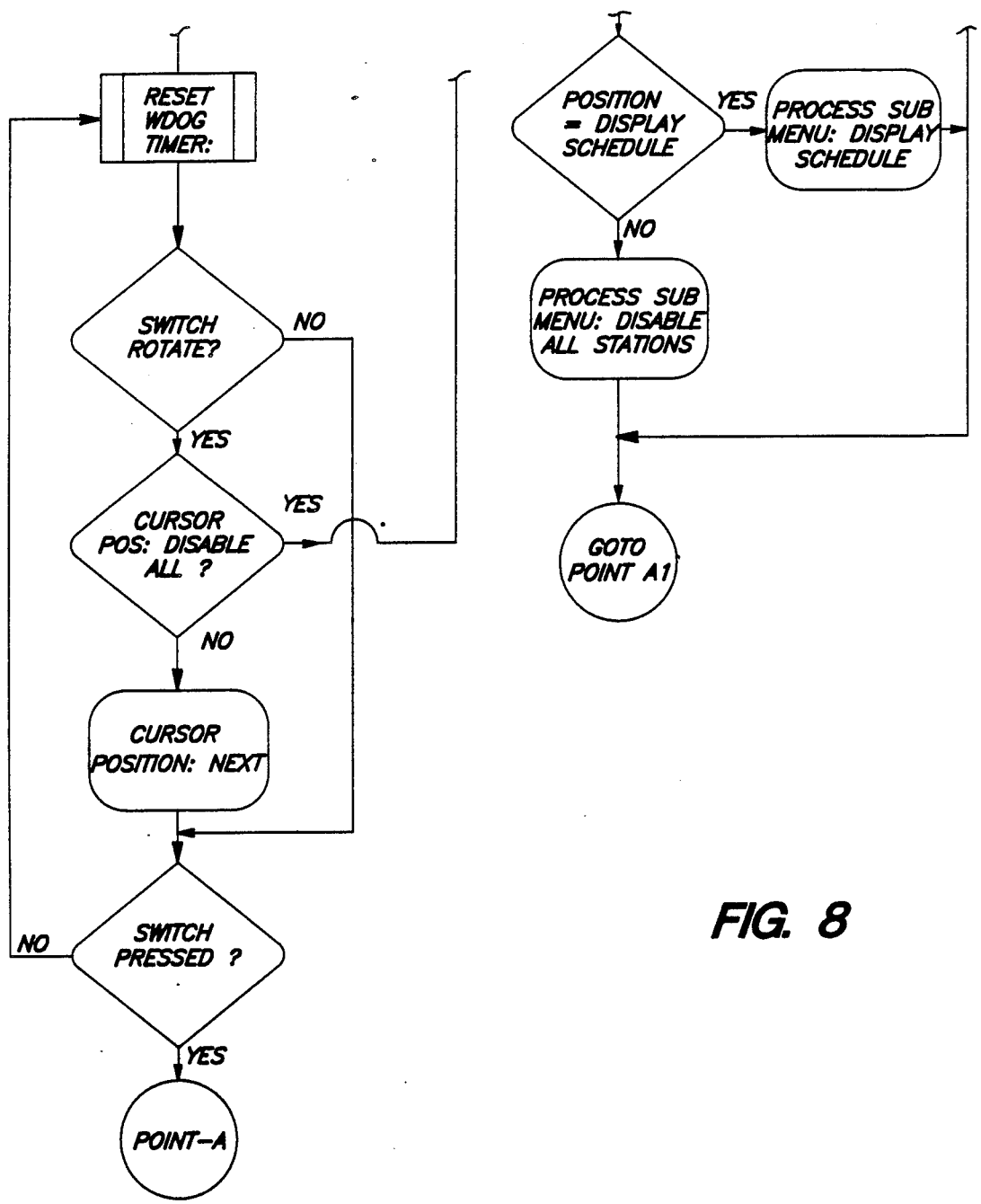
Figure 9:
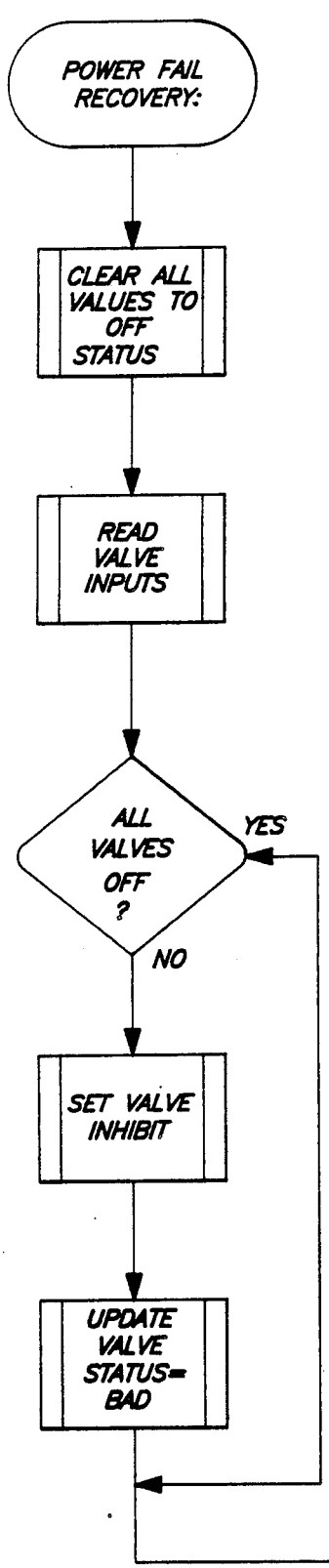
Figure 10:
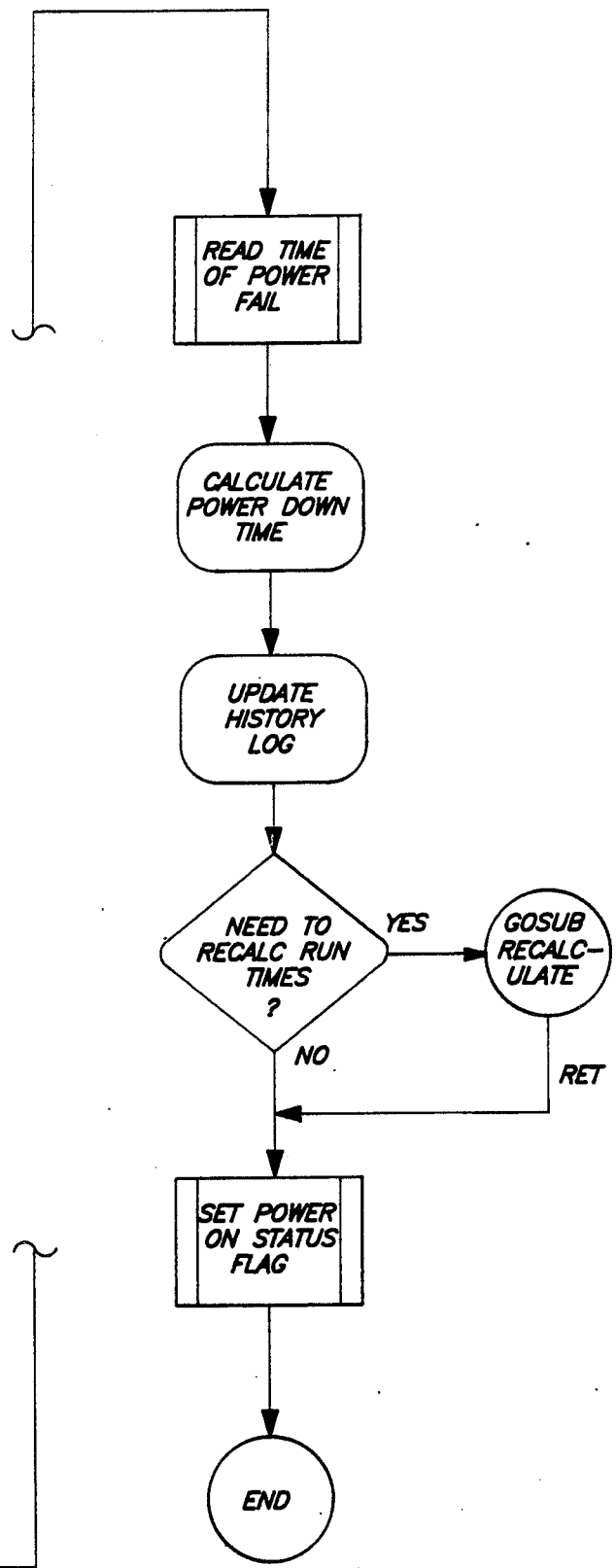
Figure 11:
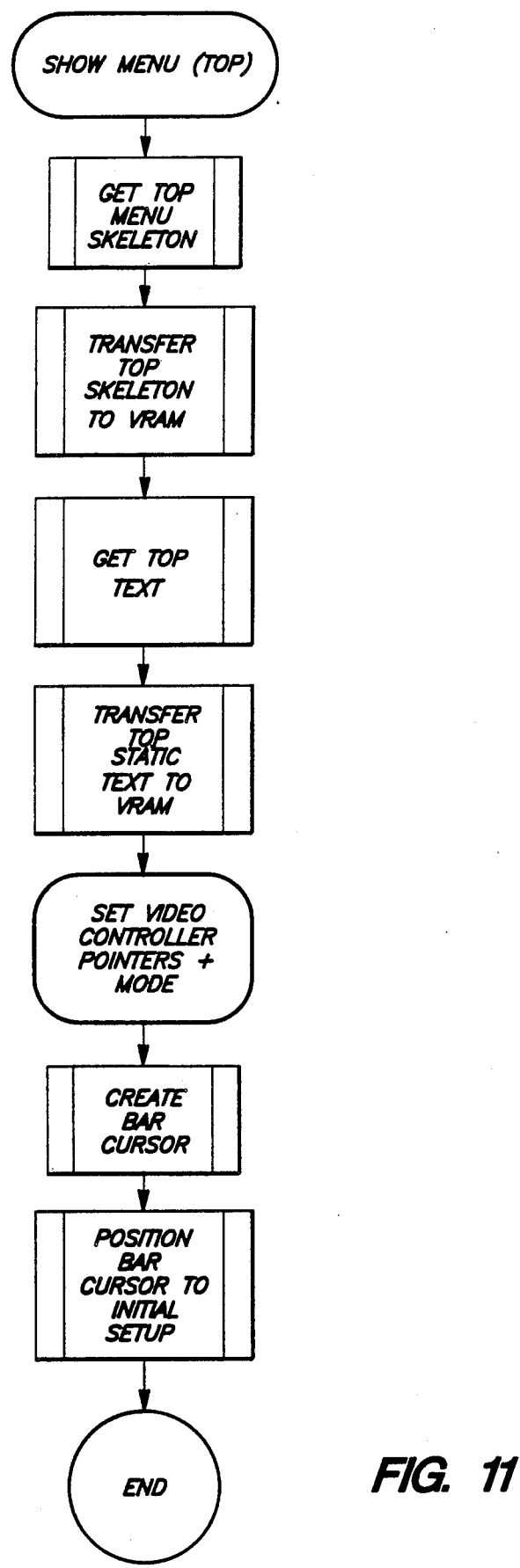
Figure 12:
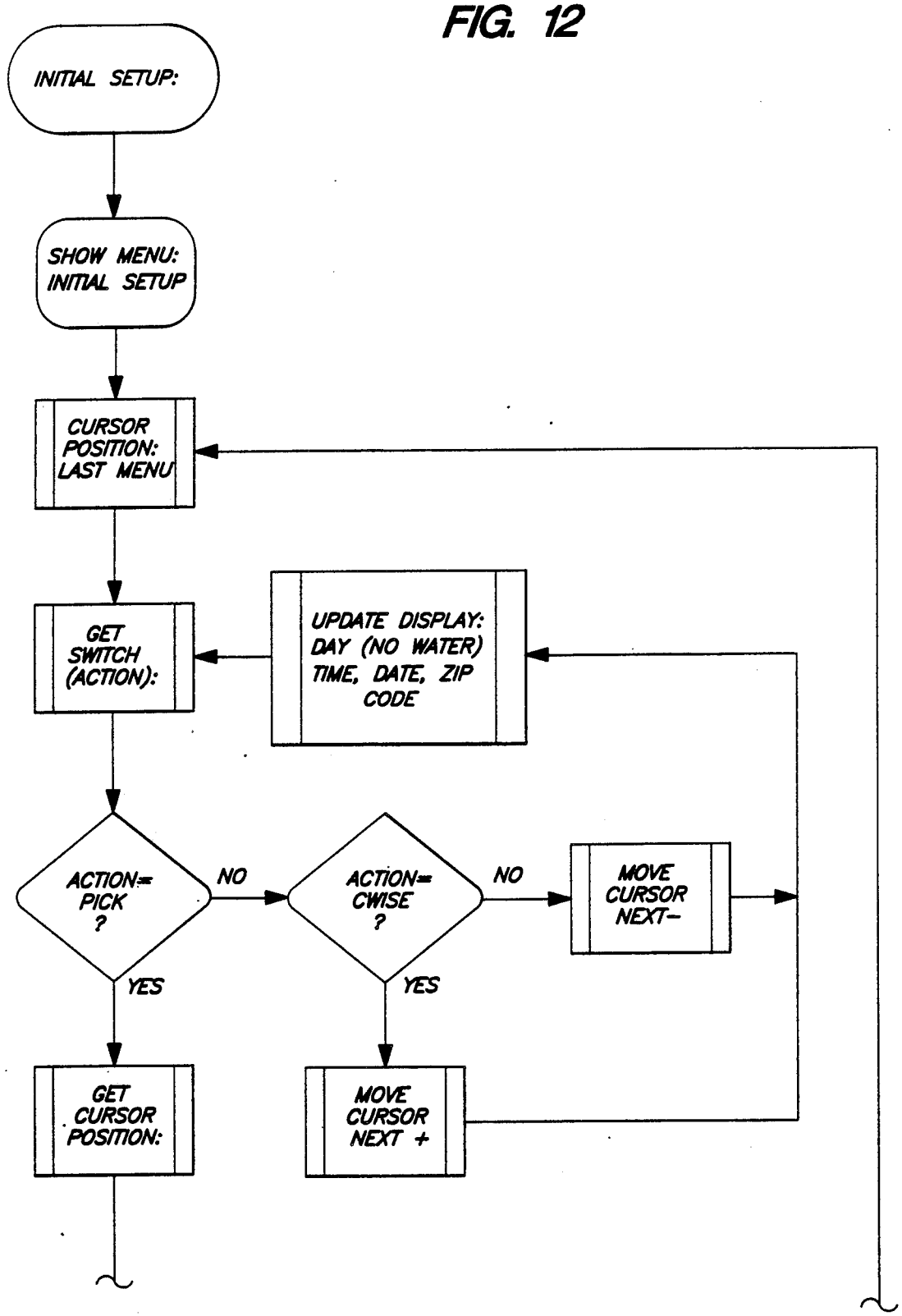
Figure 13:
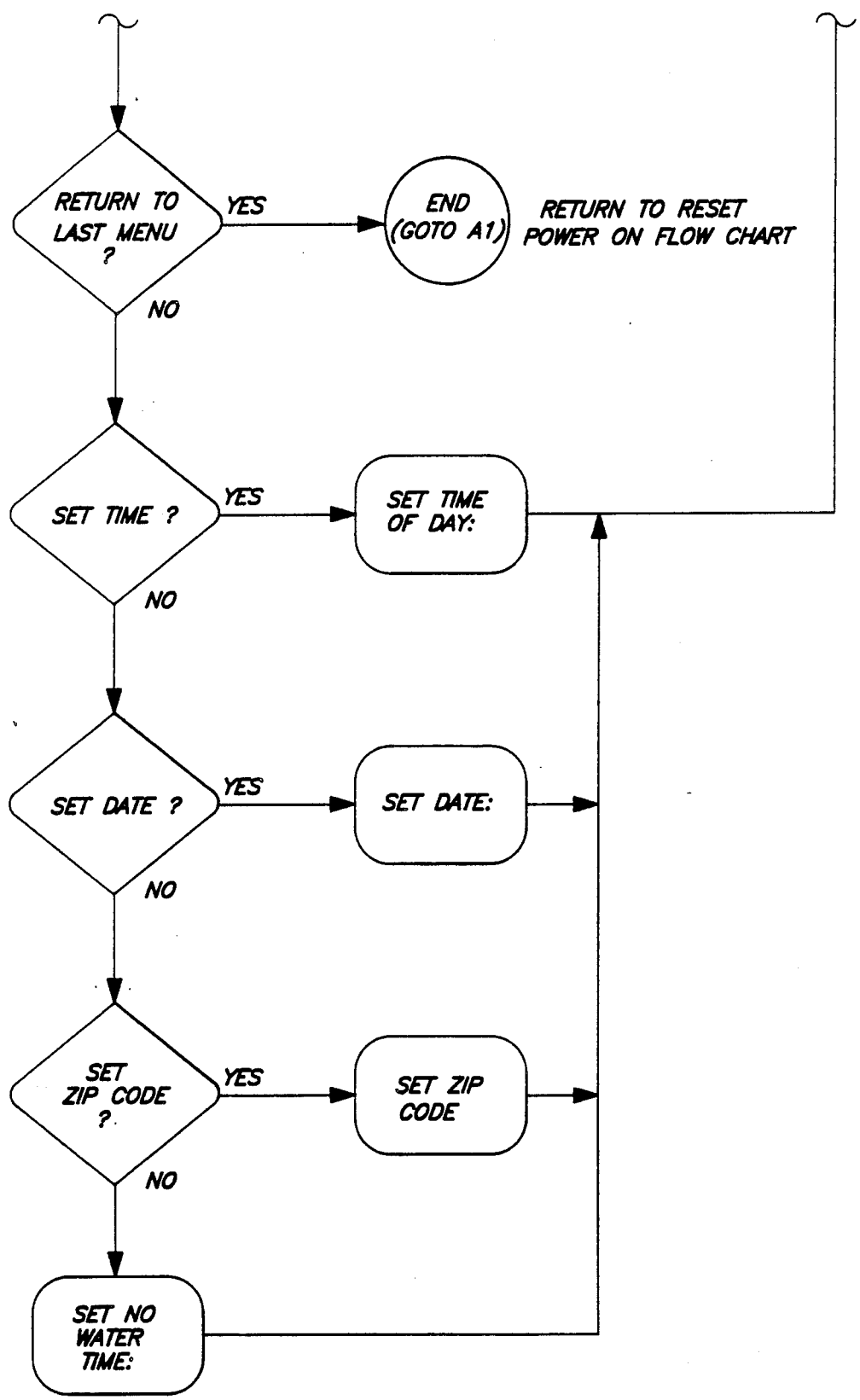
Figure 14:
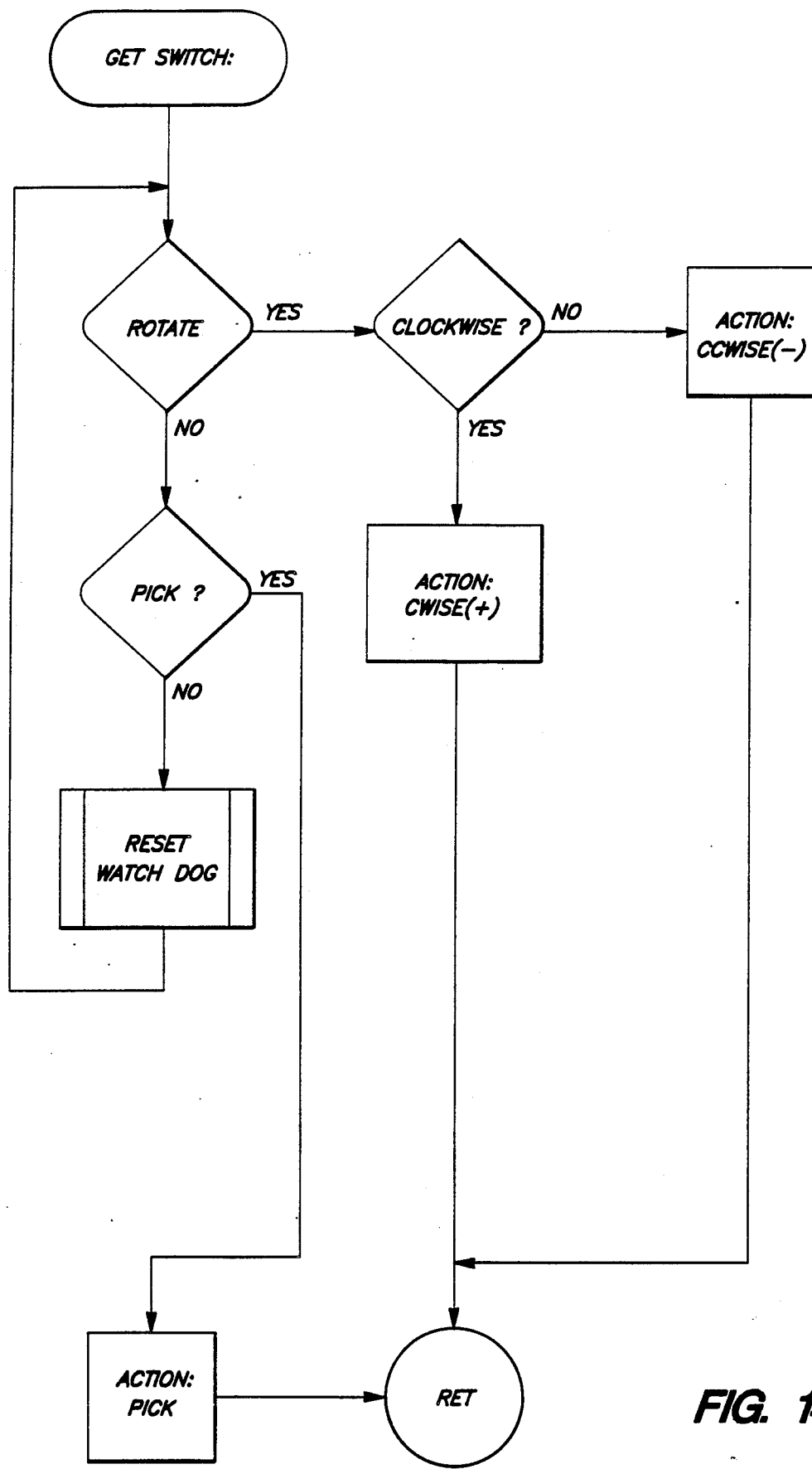
Figure 15:
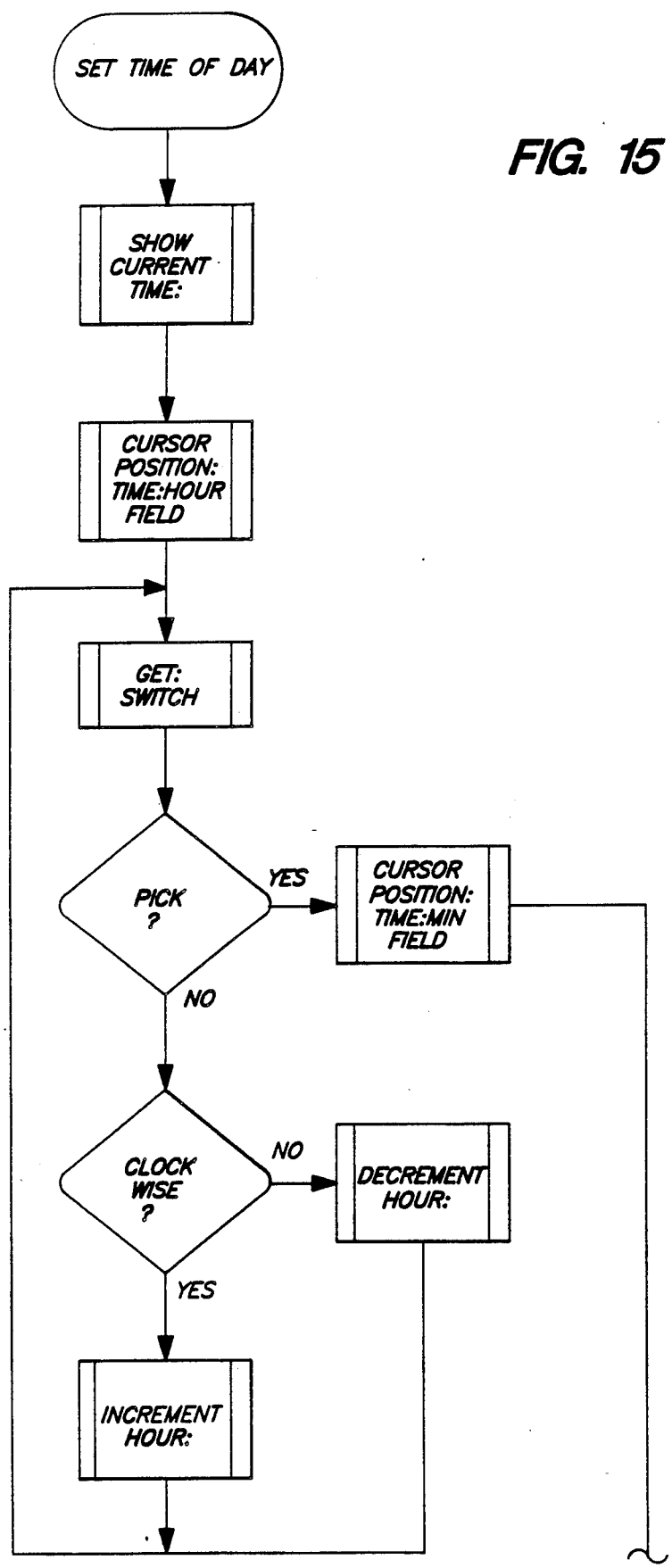
Figure 16:
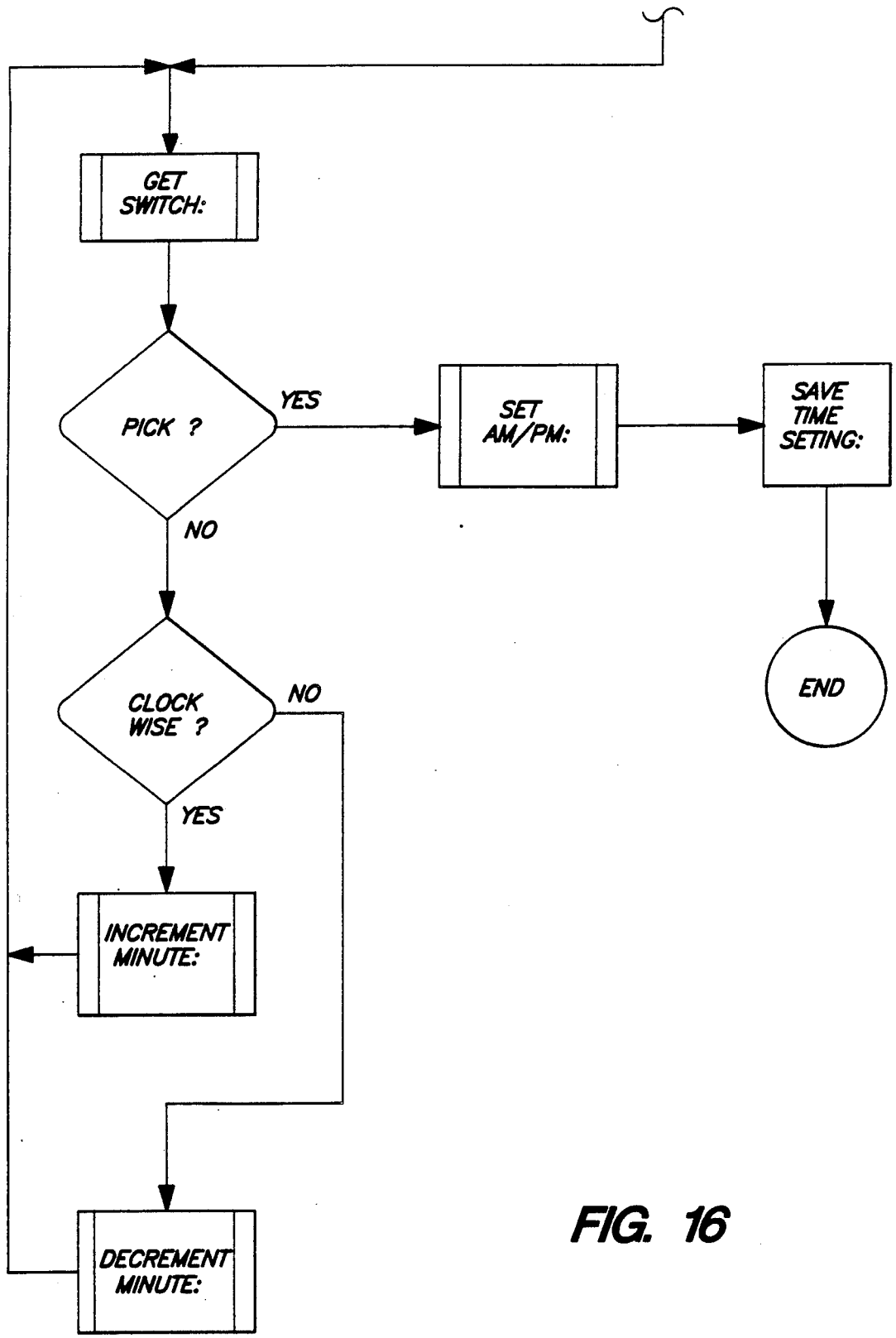
Figure 17:
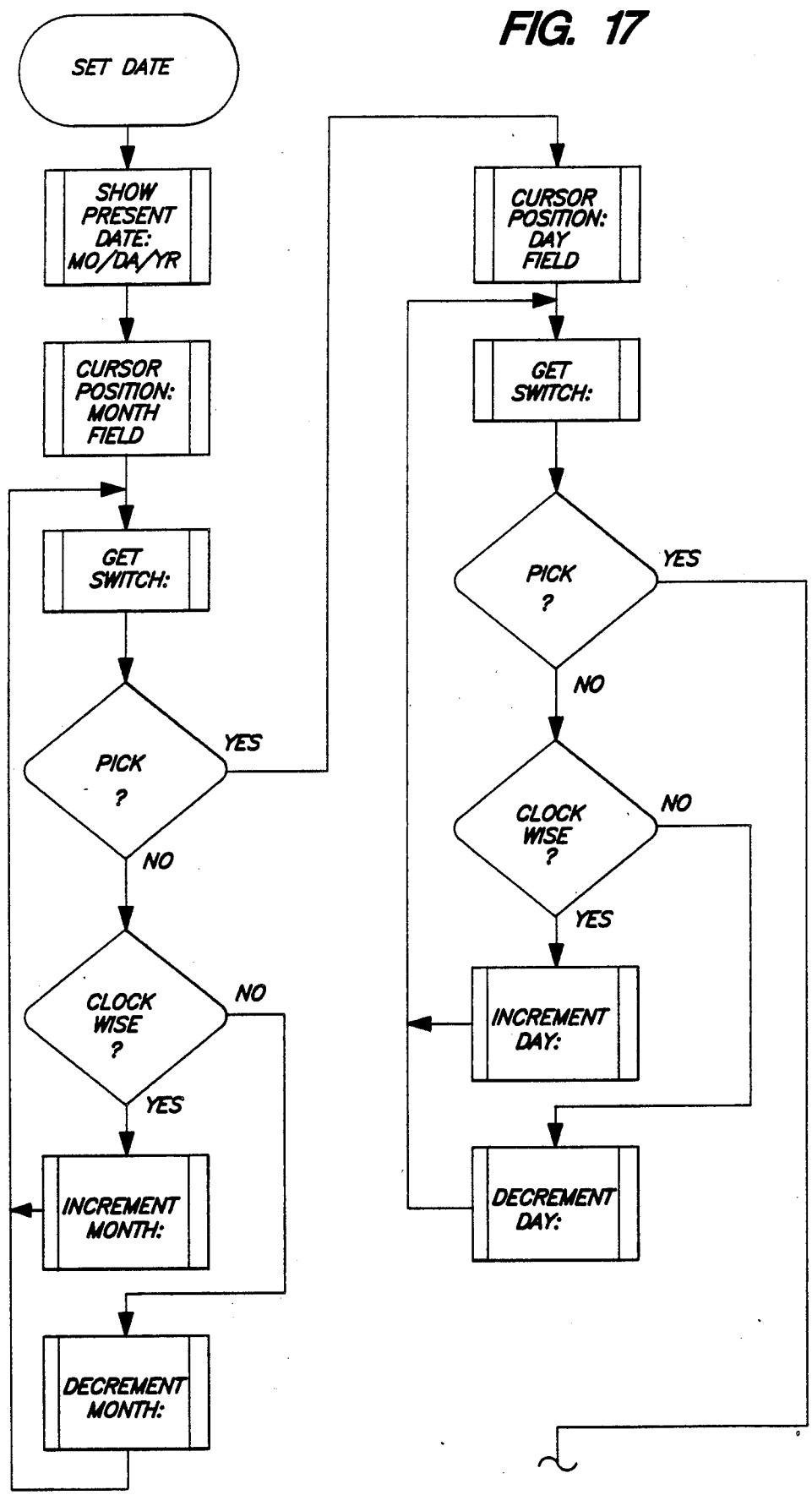
Figure 18:
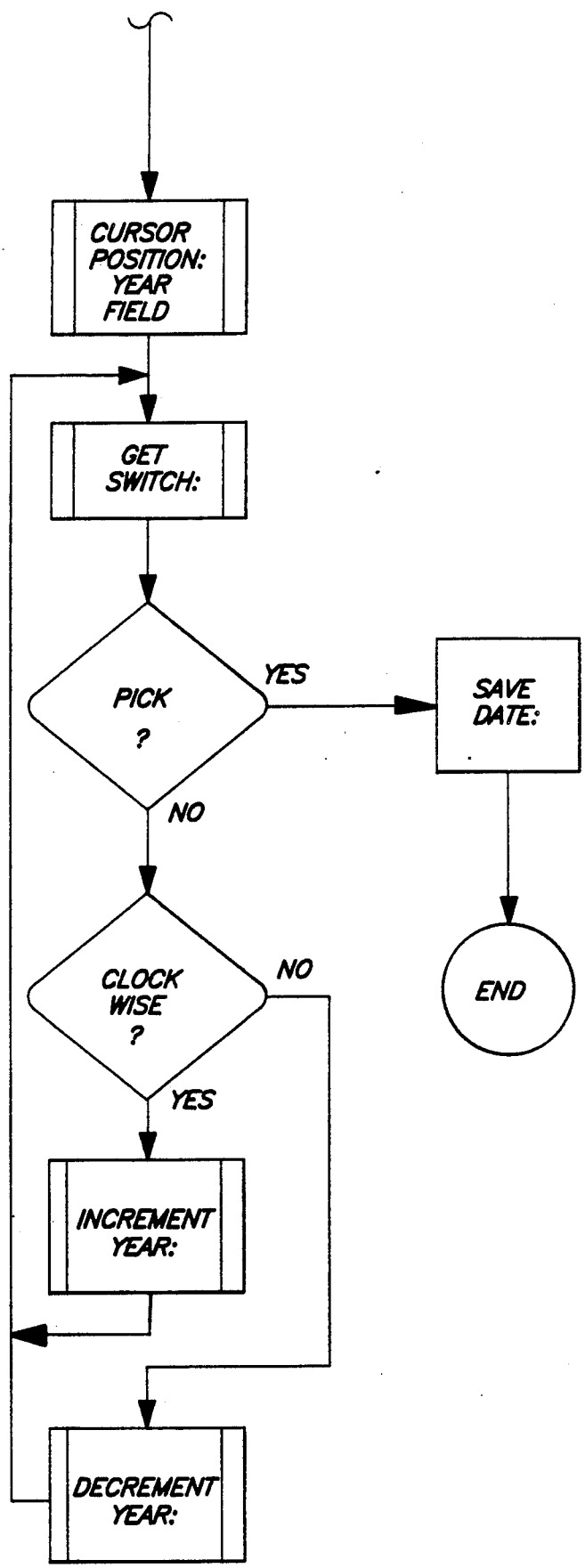
Figure 19:
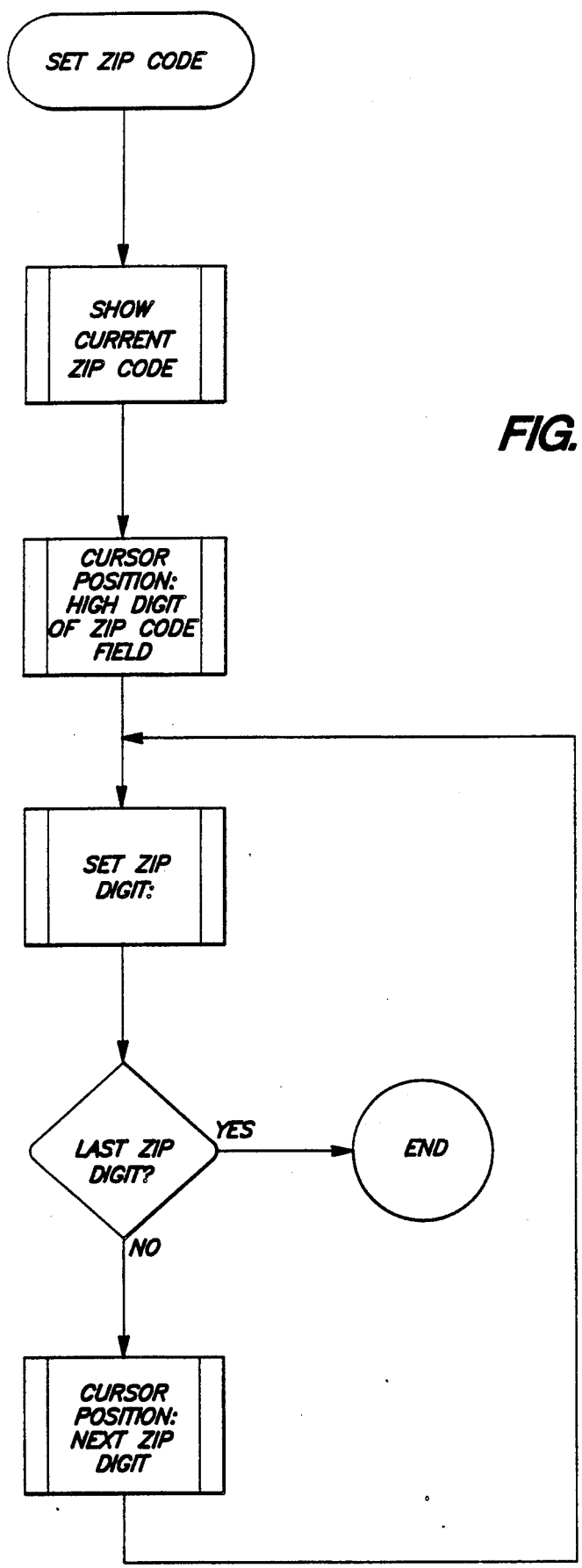
Figure 20:
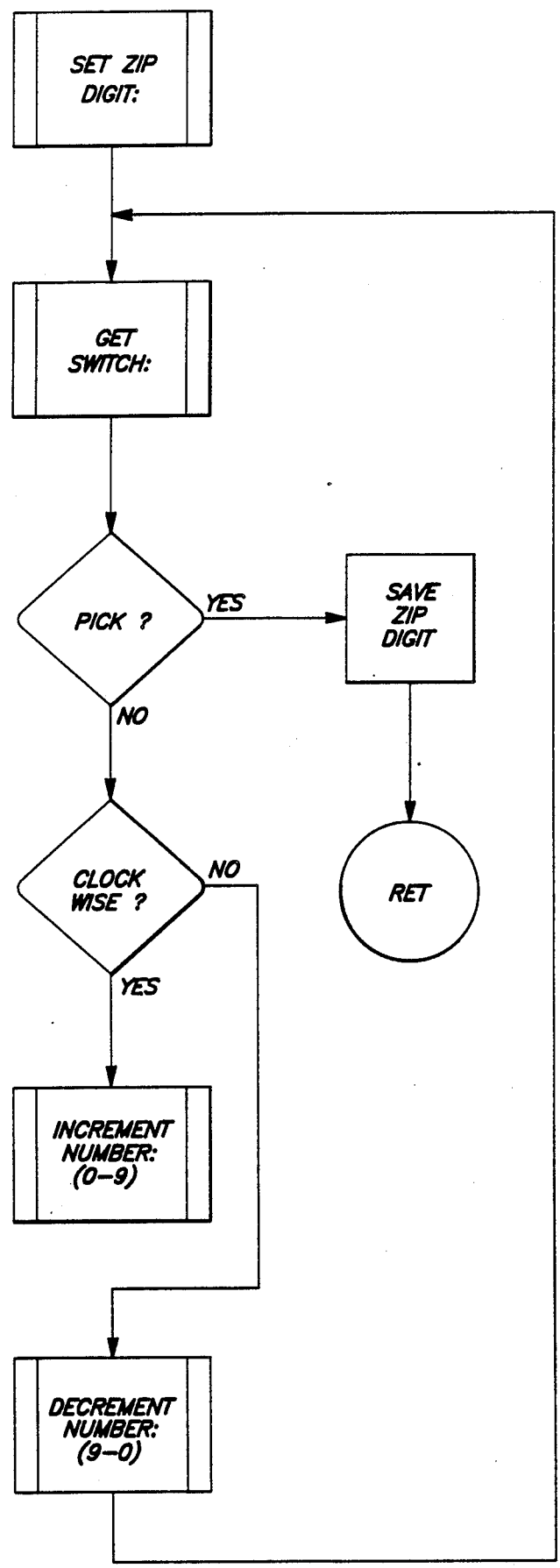
Figure 21:
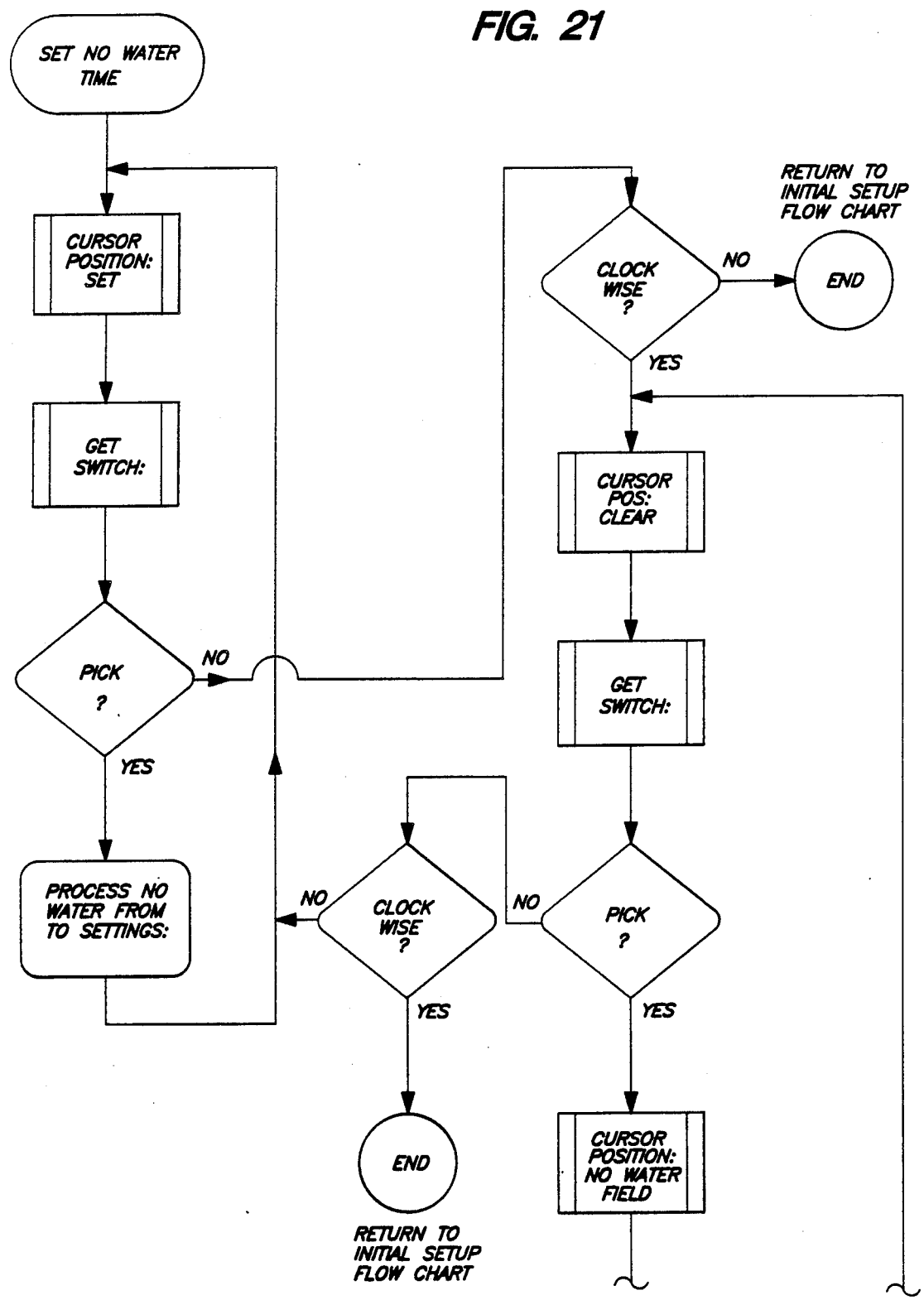
Figure 22:
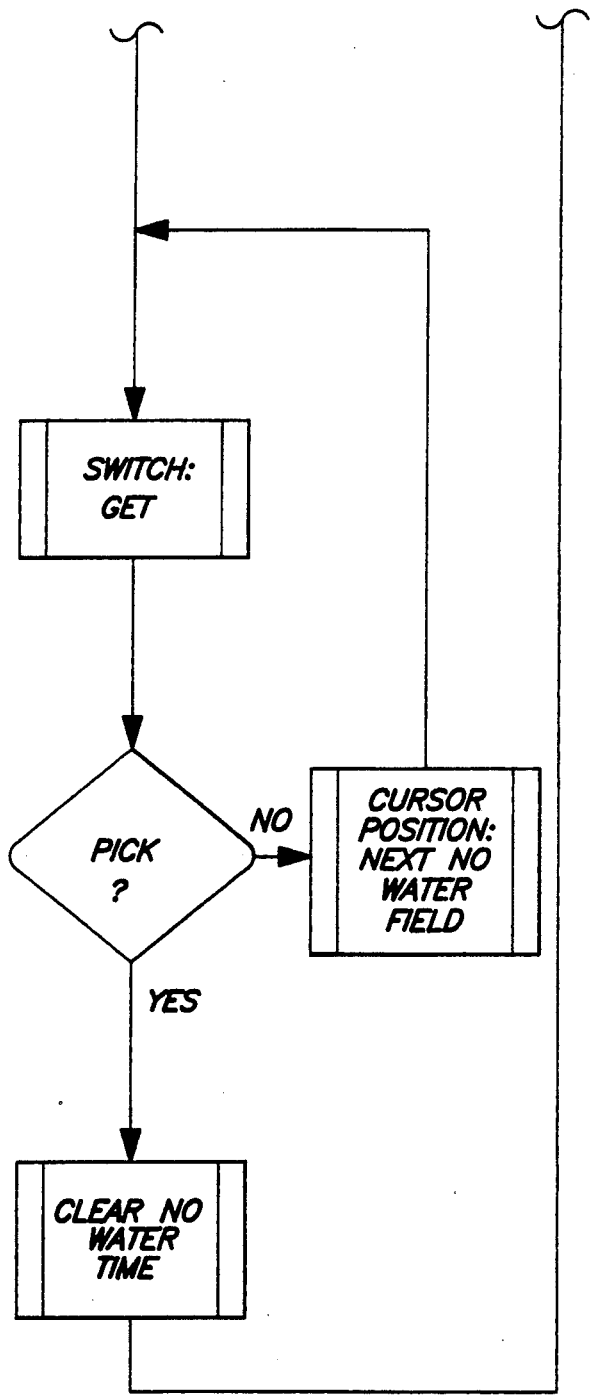
Figure 23:
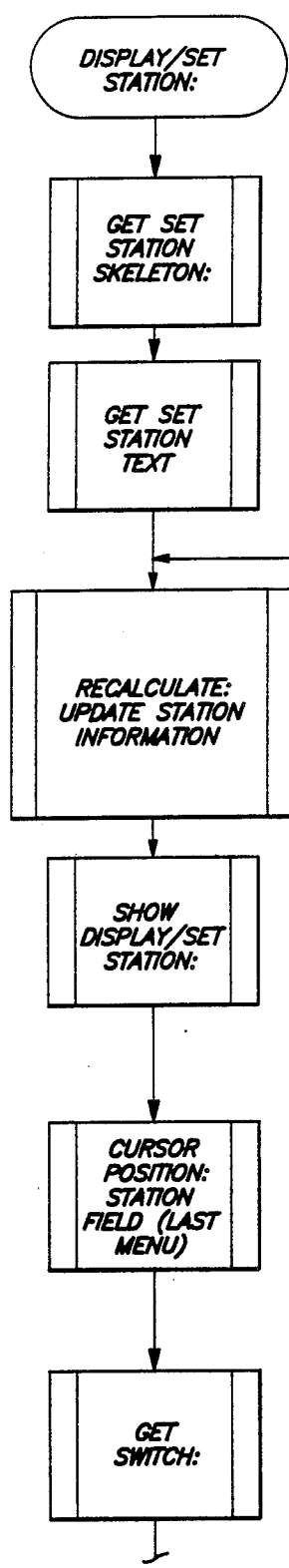
Figure 24:
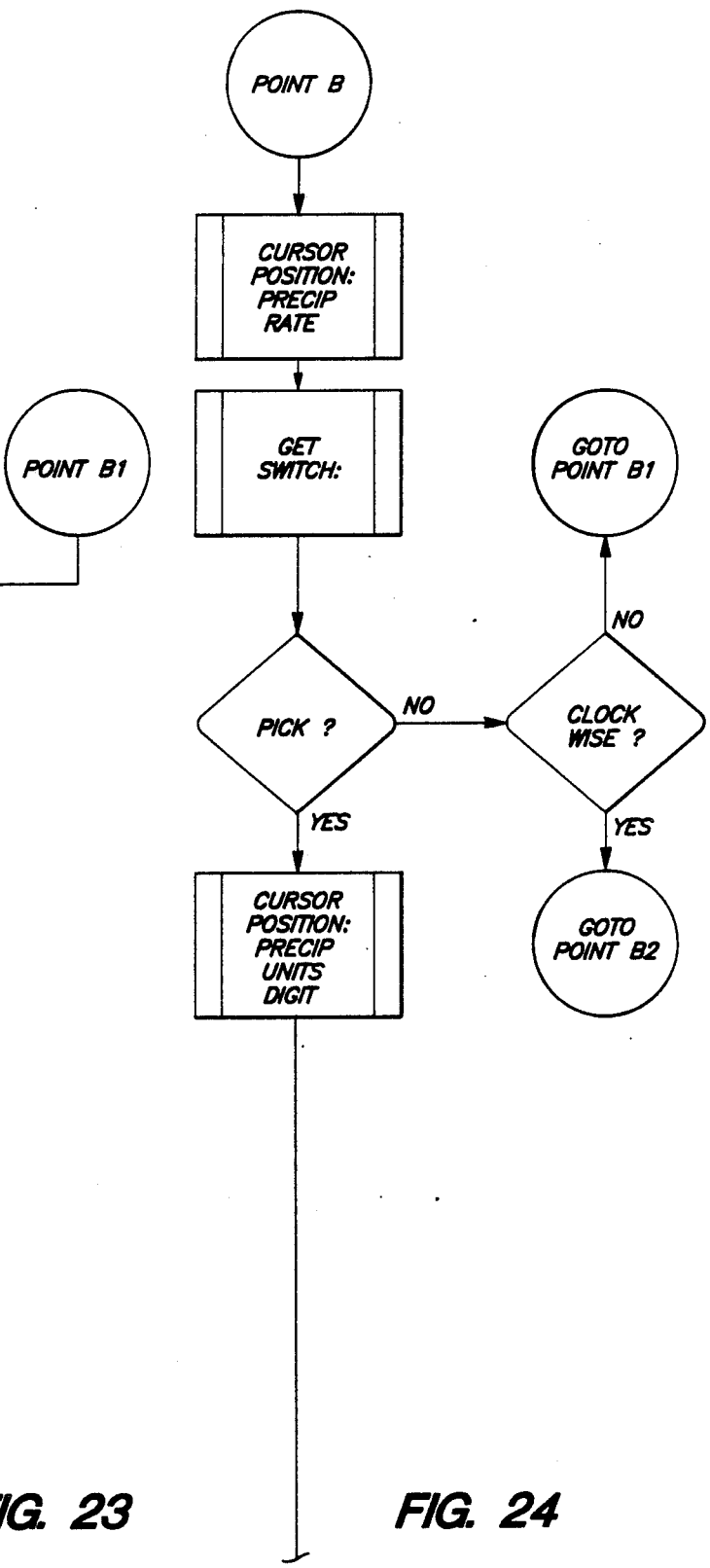
Figure 25:
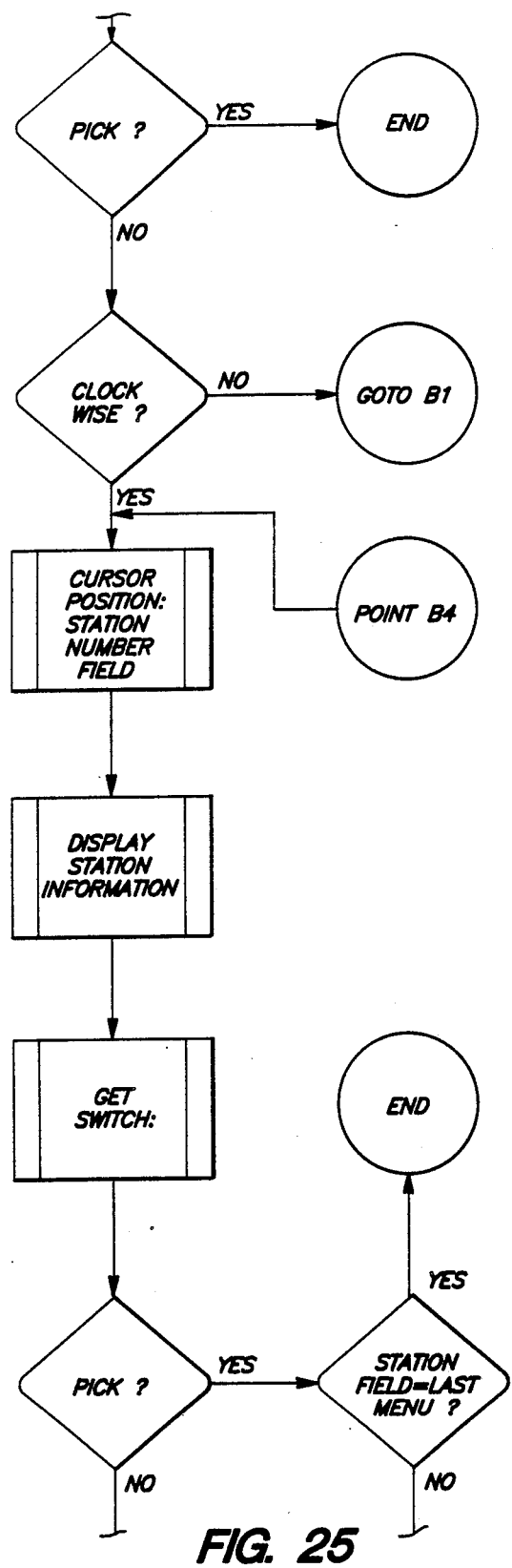
Figure 26:
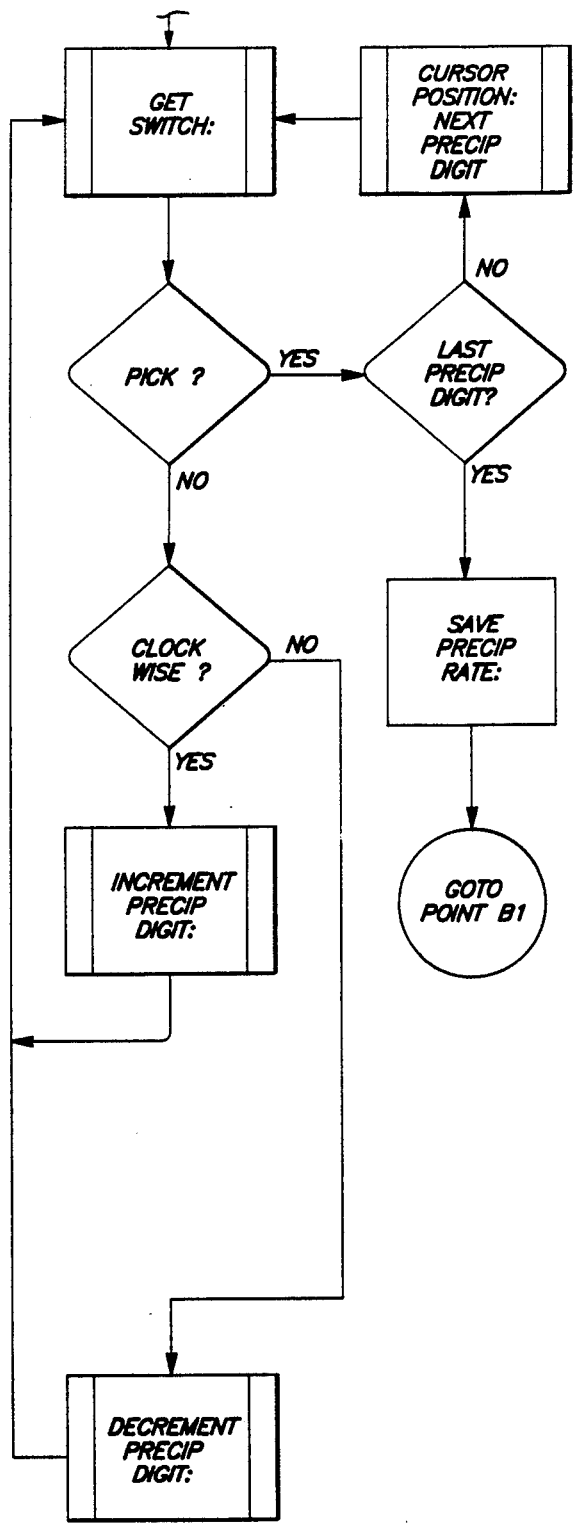
Figure 27:
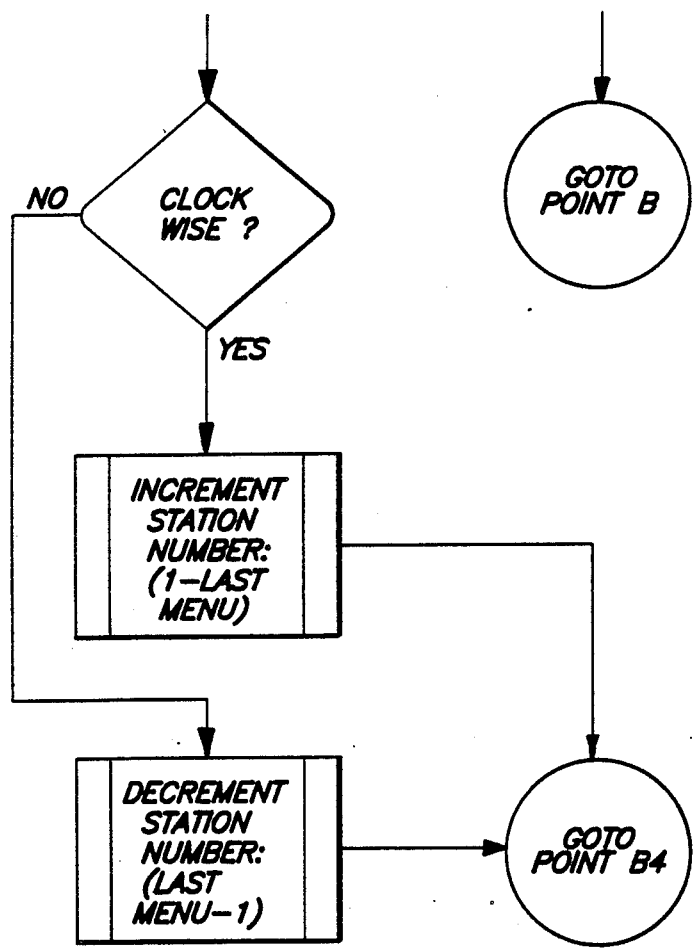
Figure 28:
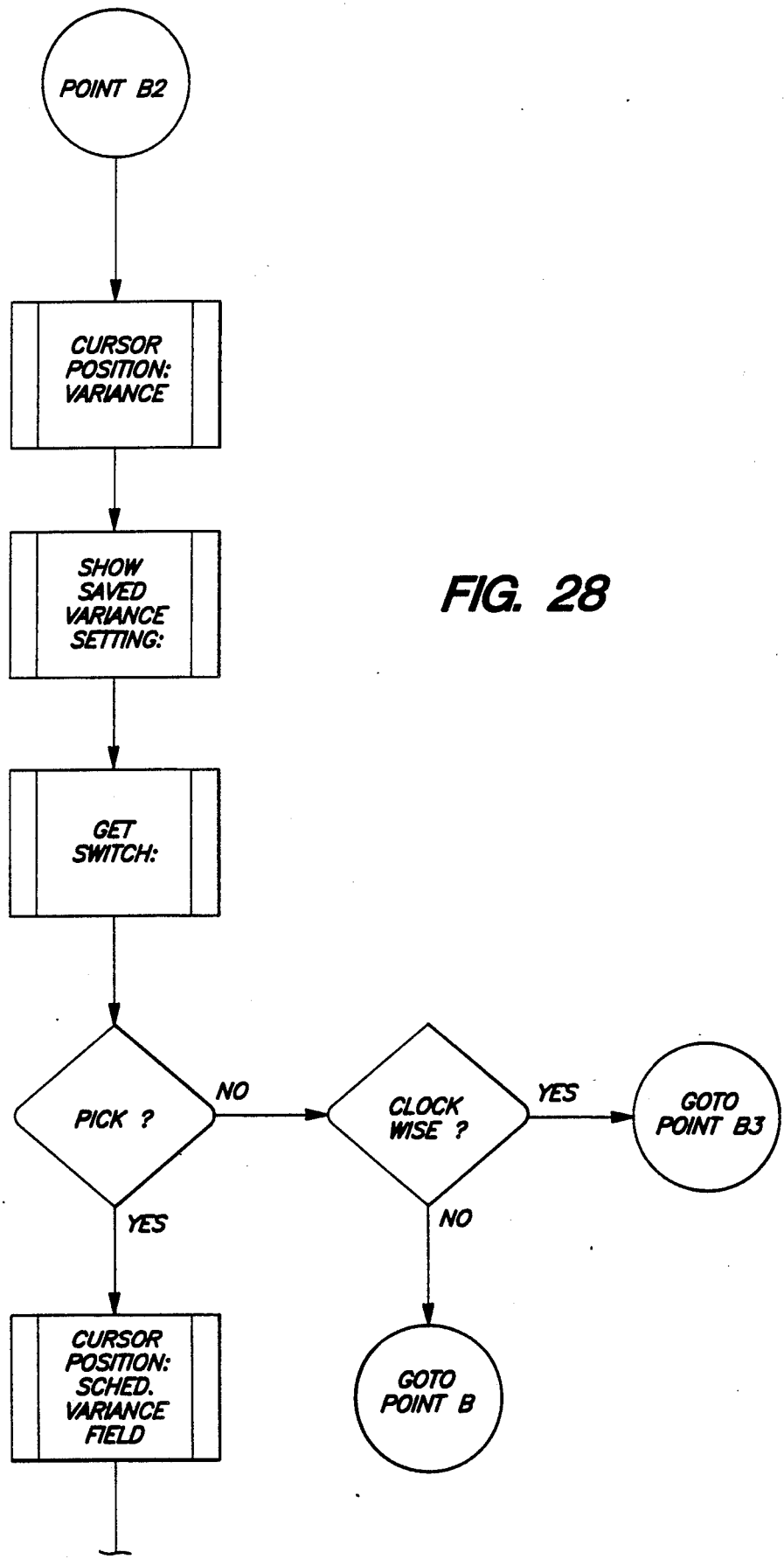
Figure 29:
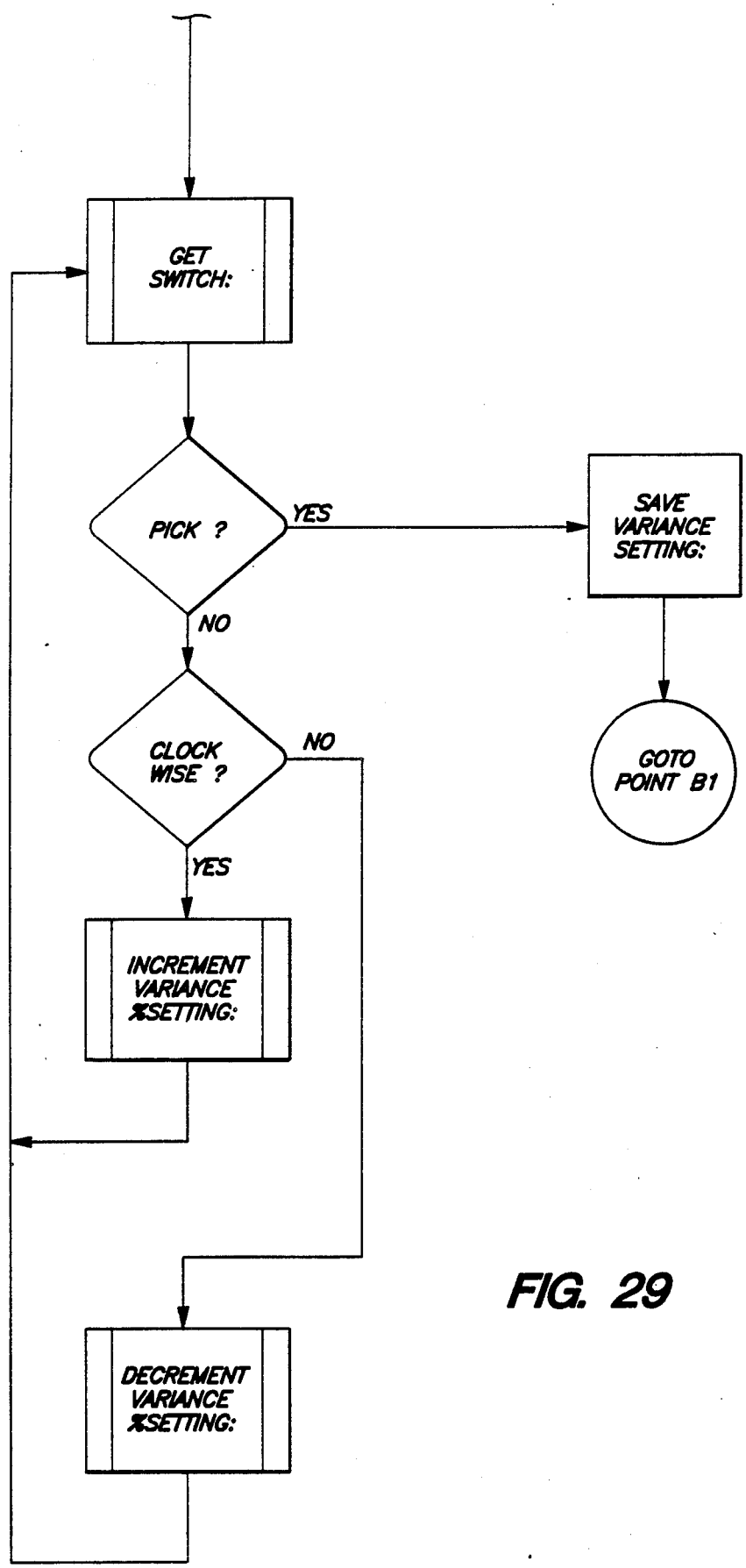
Figure 30:
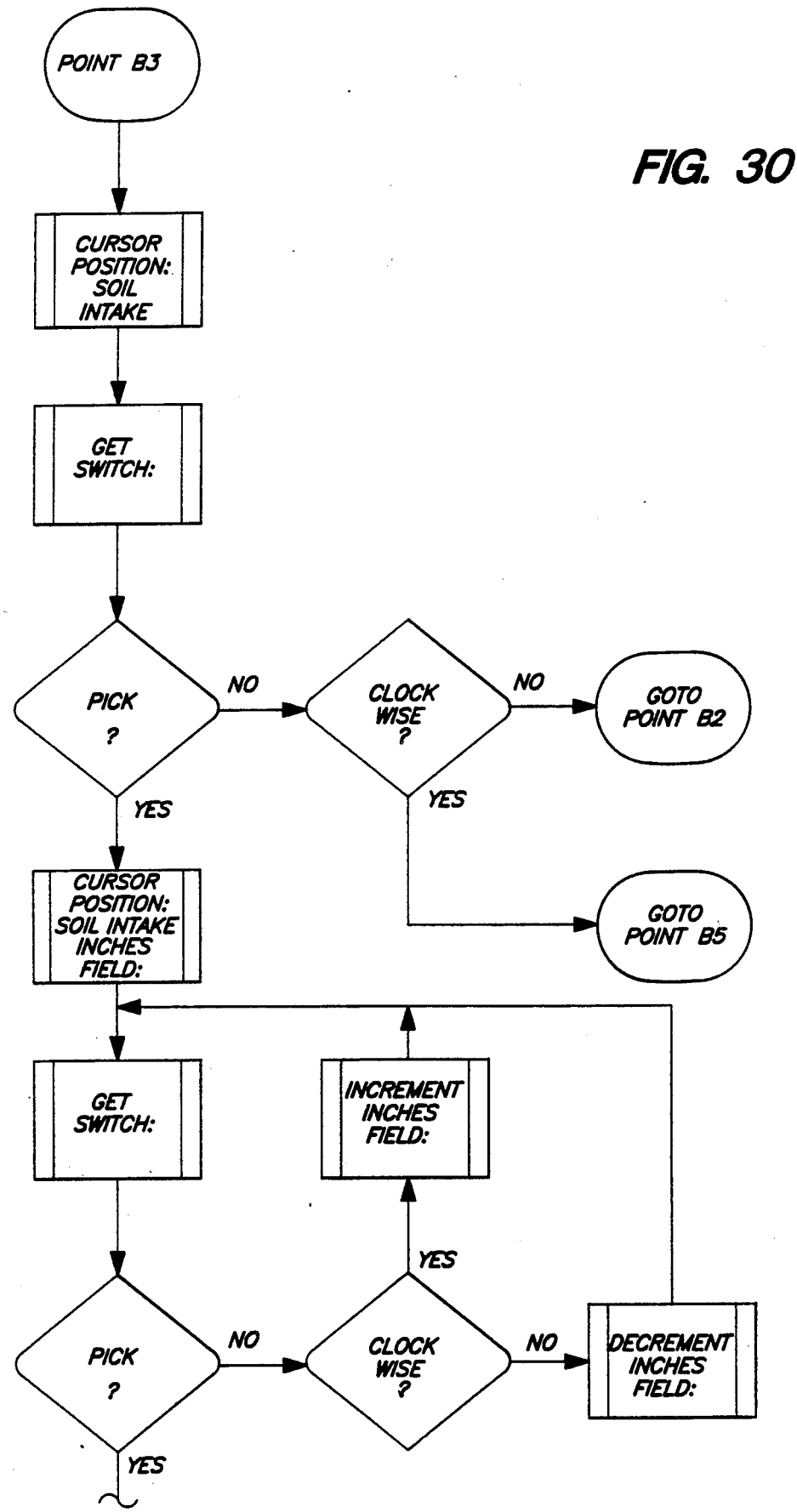
Figure 31:
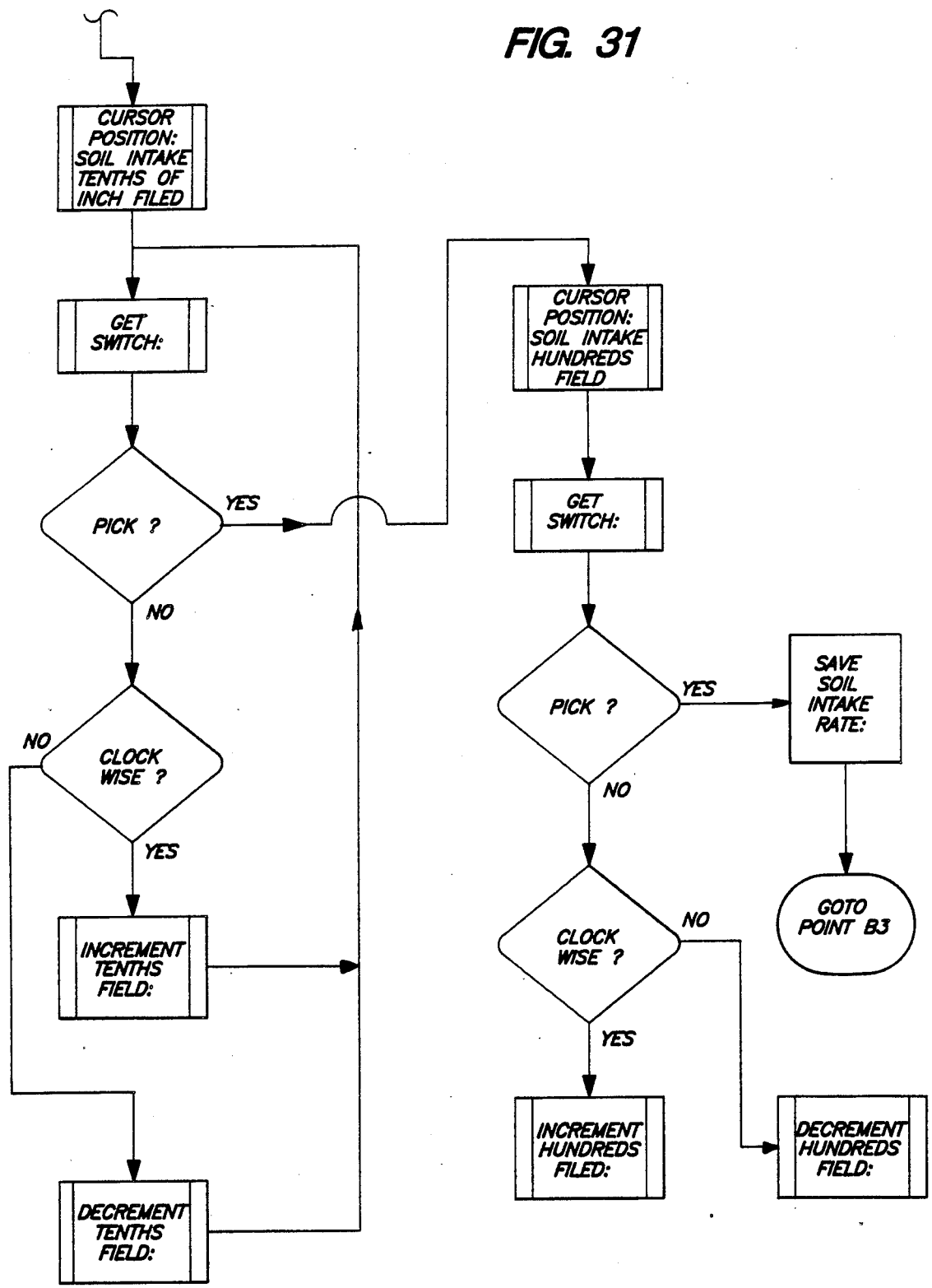
Figure 32:
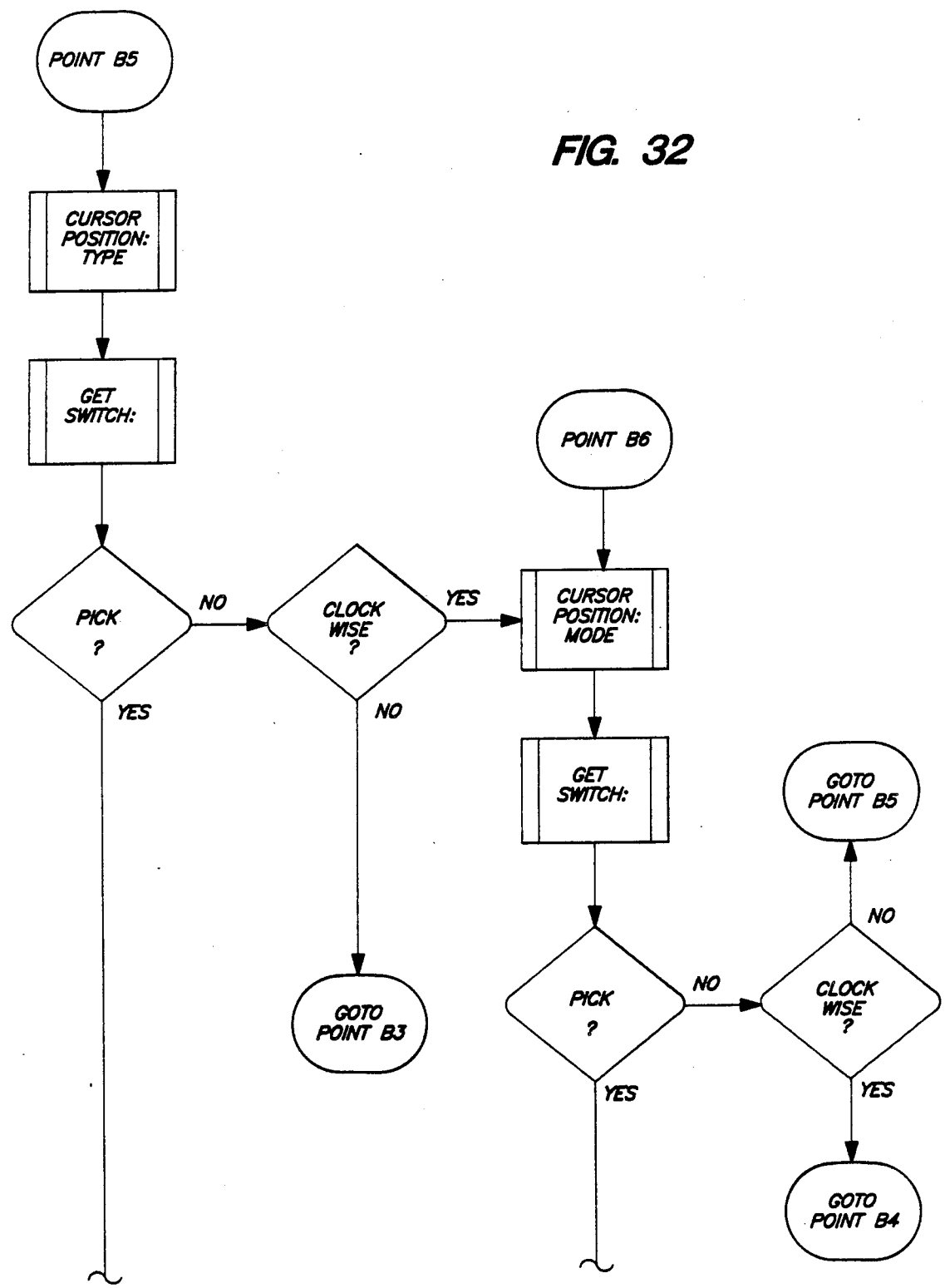
Figure 33:
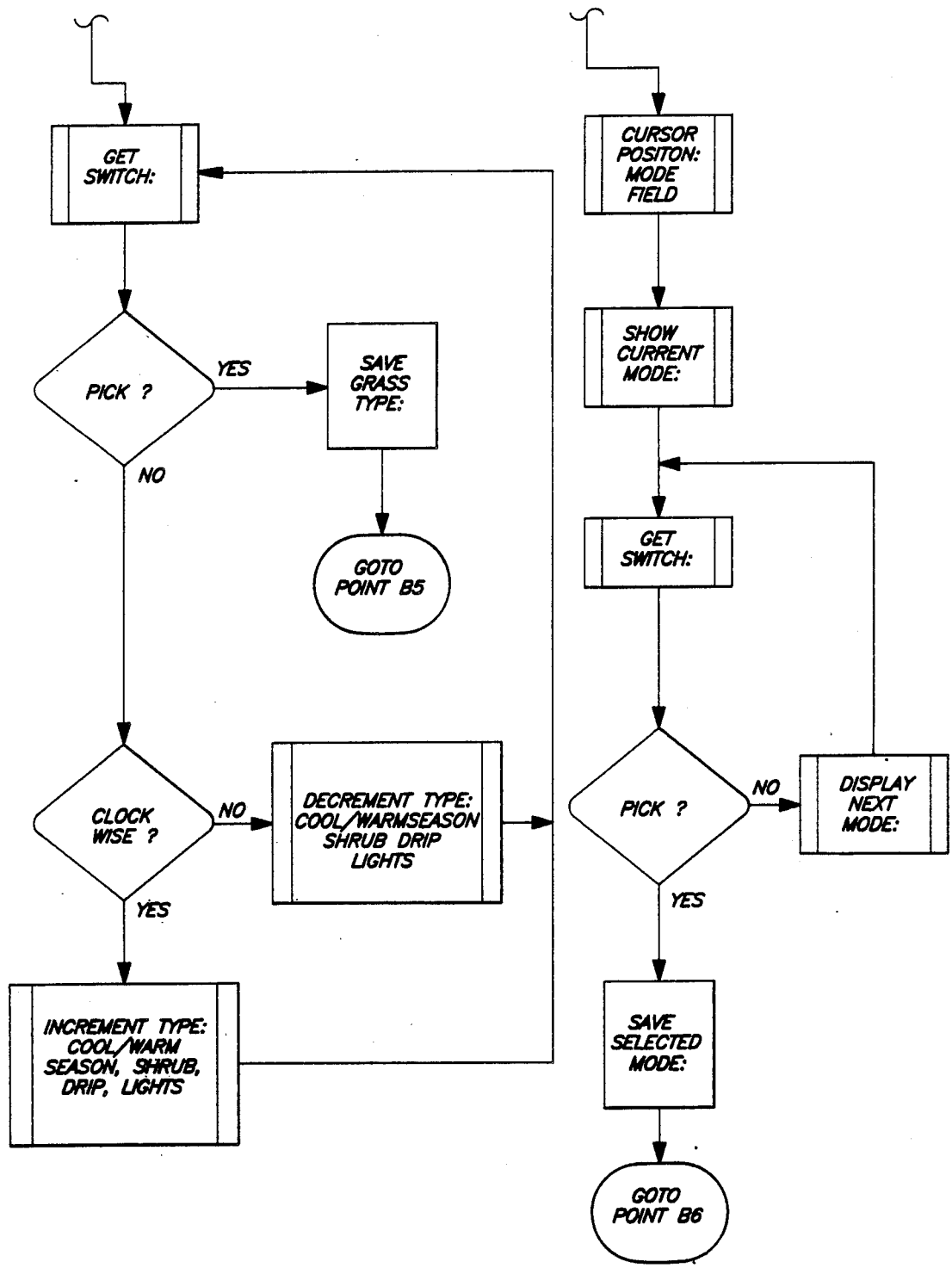
Figure 34:
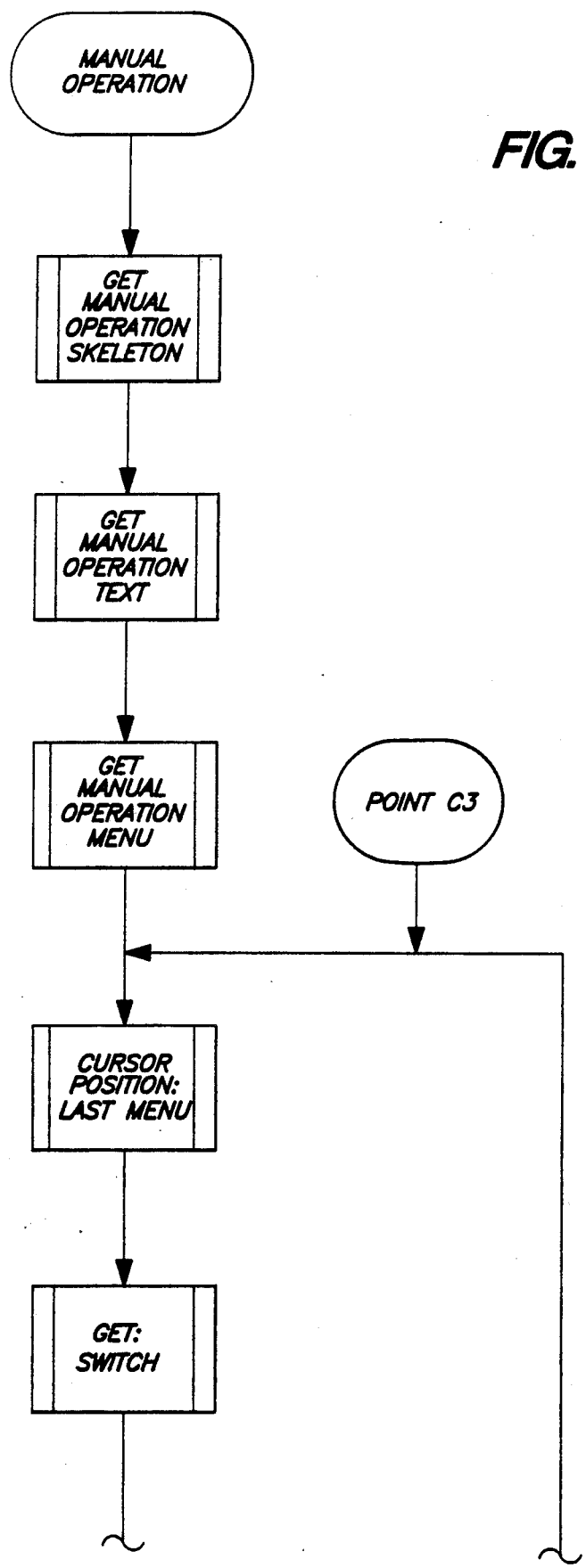
Figure 35:
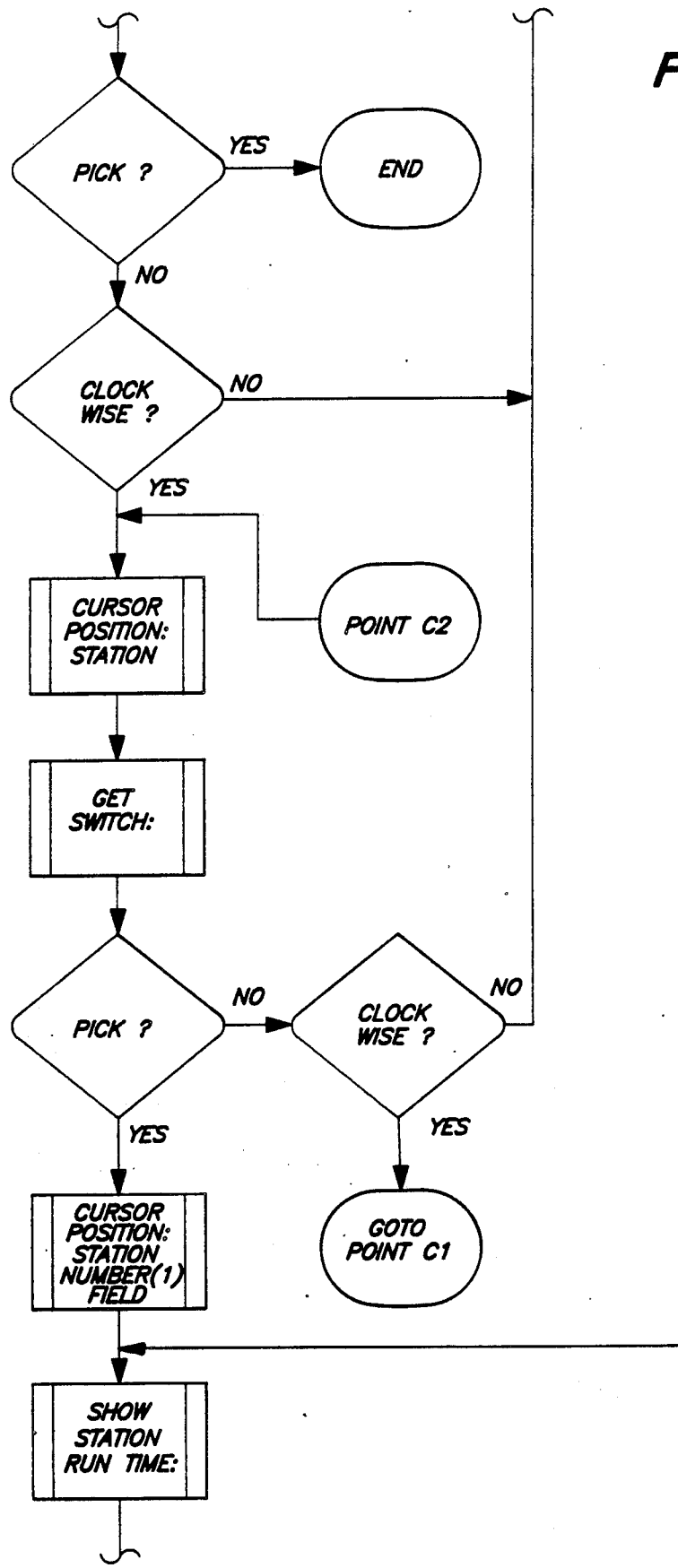
Figure 36:
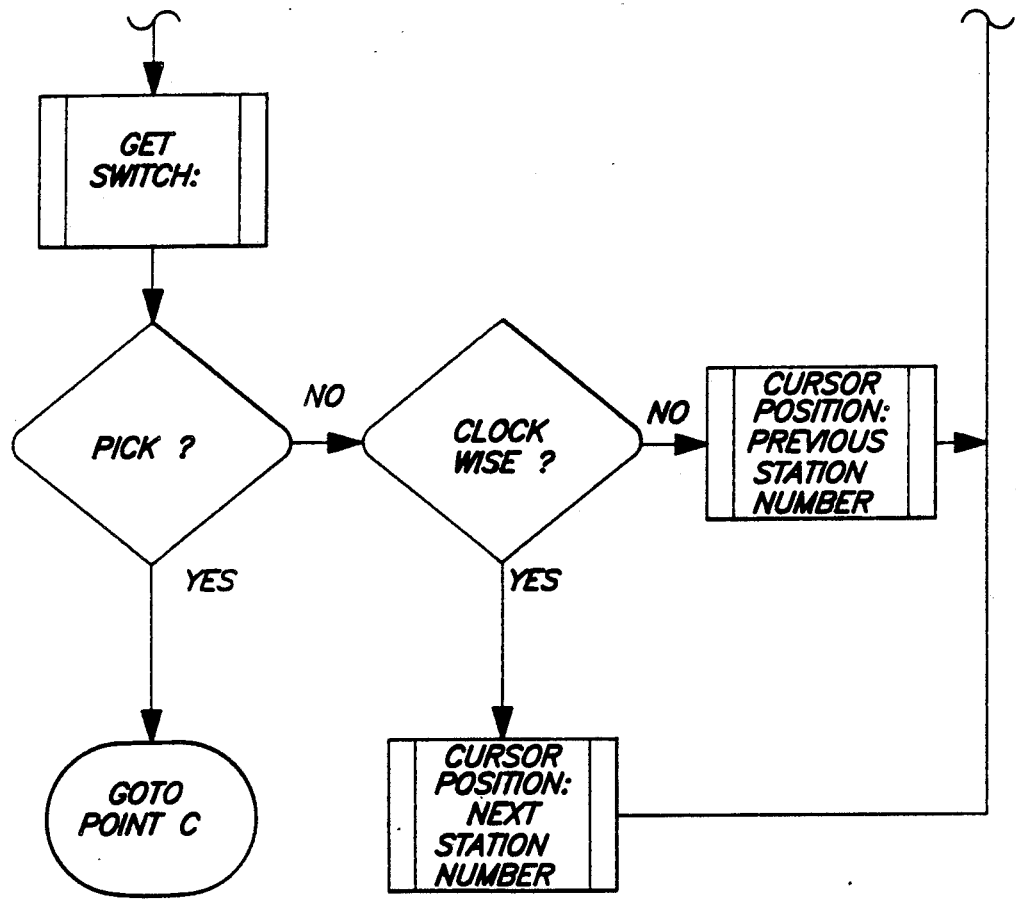
Figure 37:
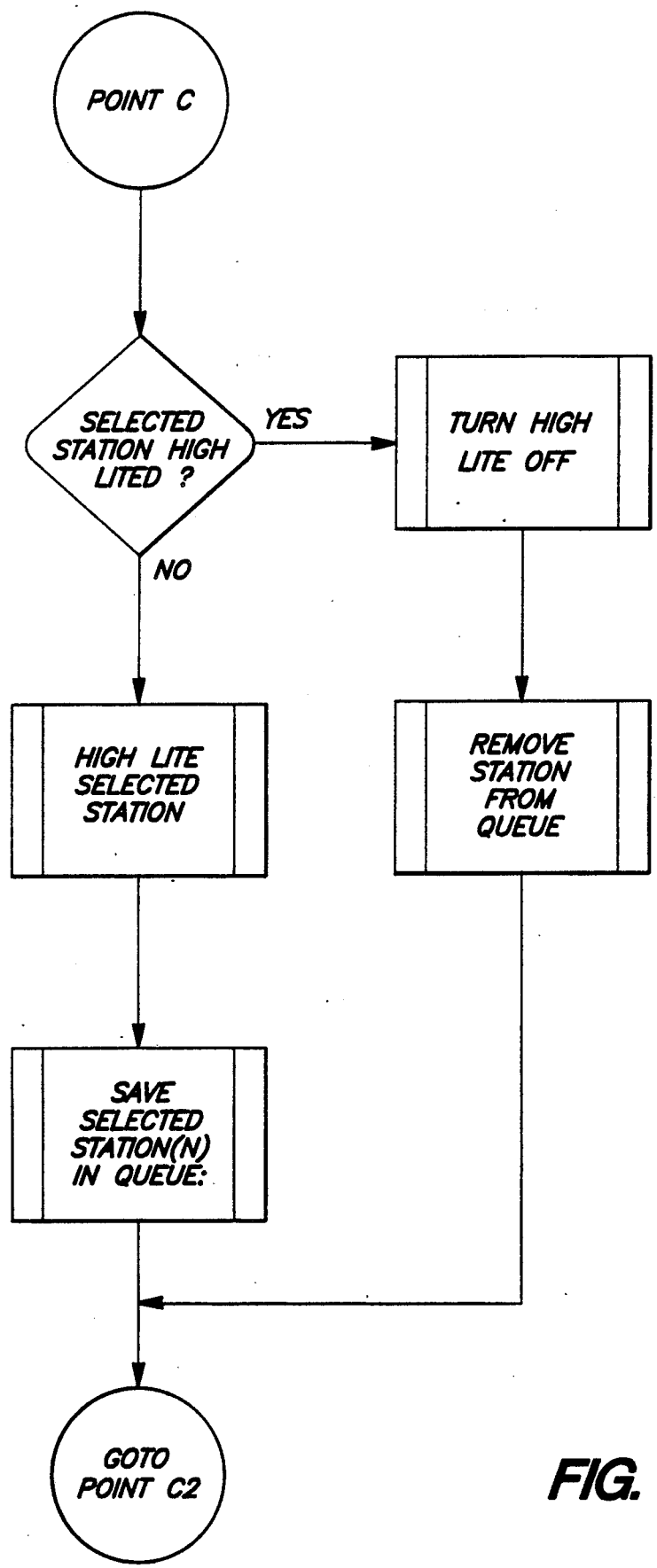
Figure 38:
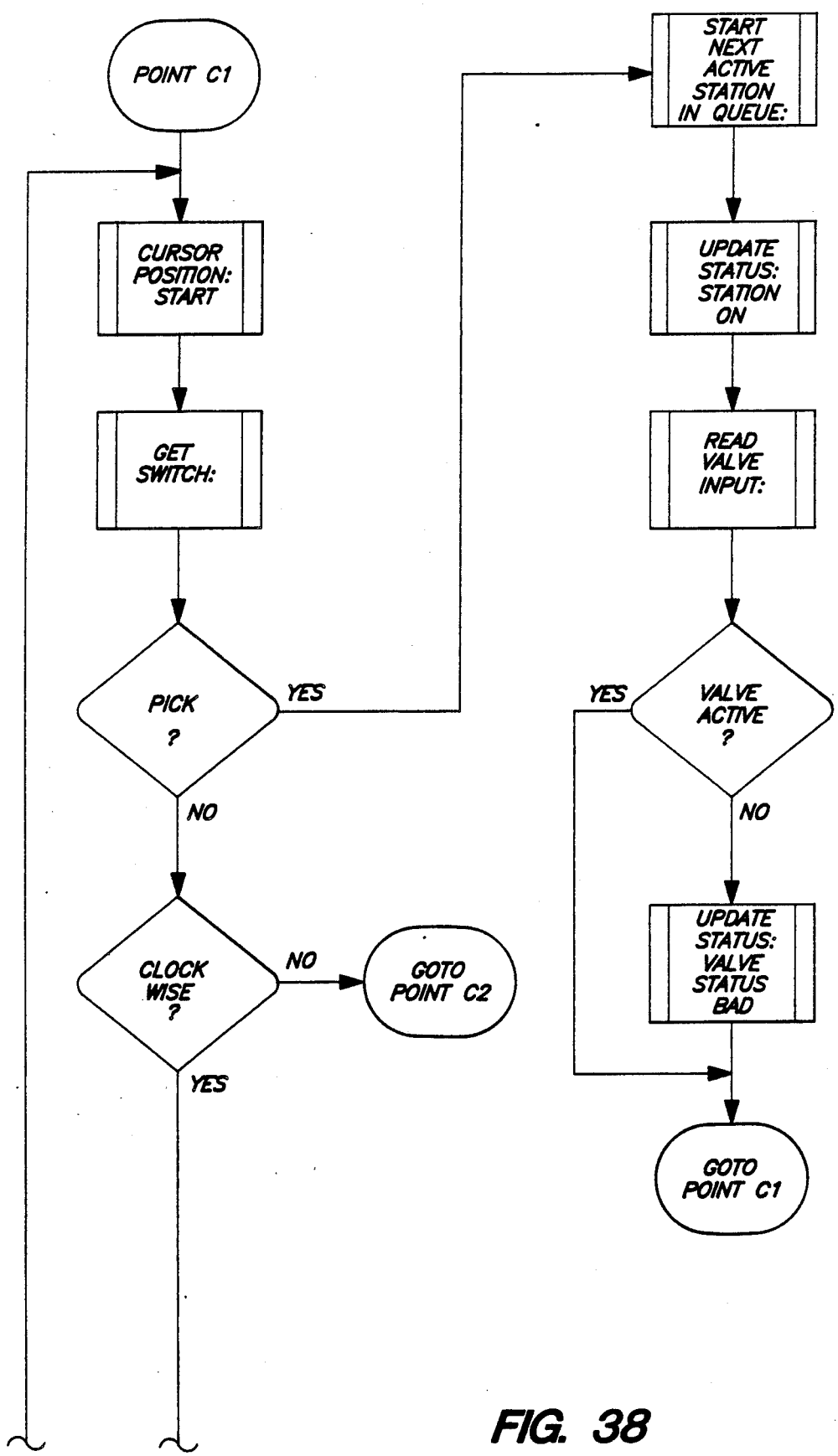
Figure 39:
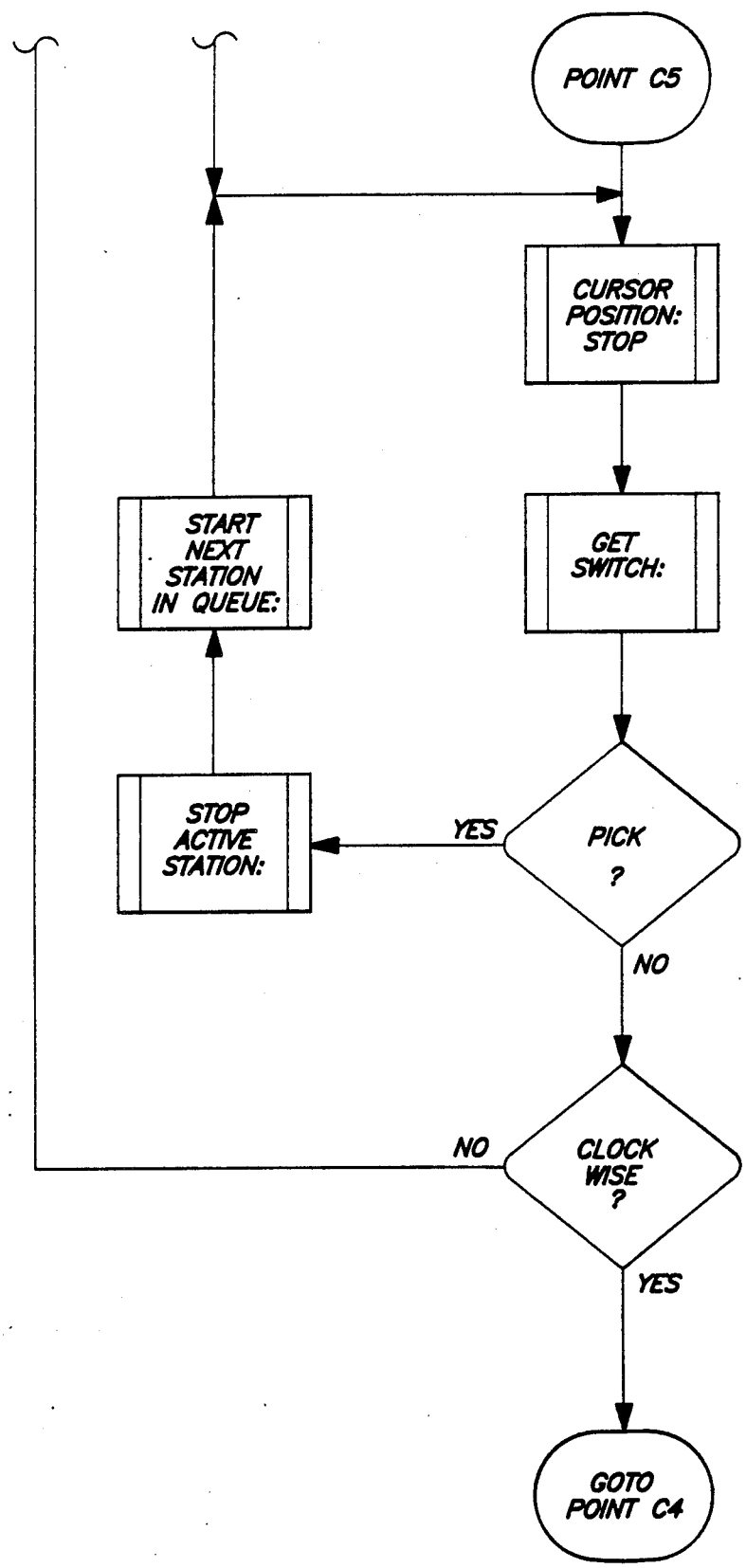
Figure 40:
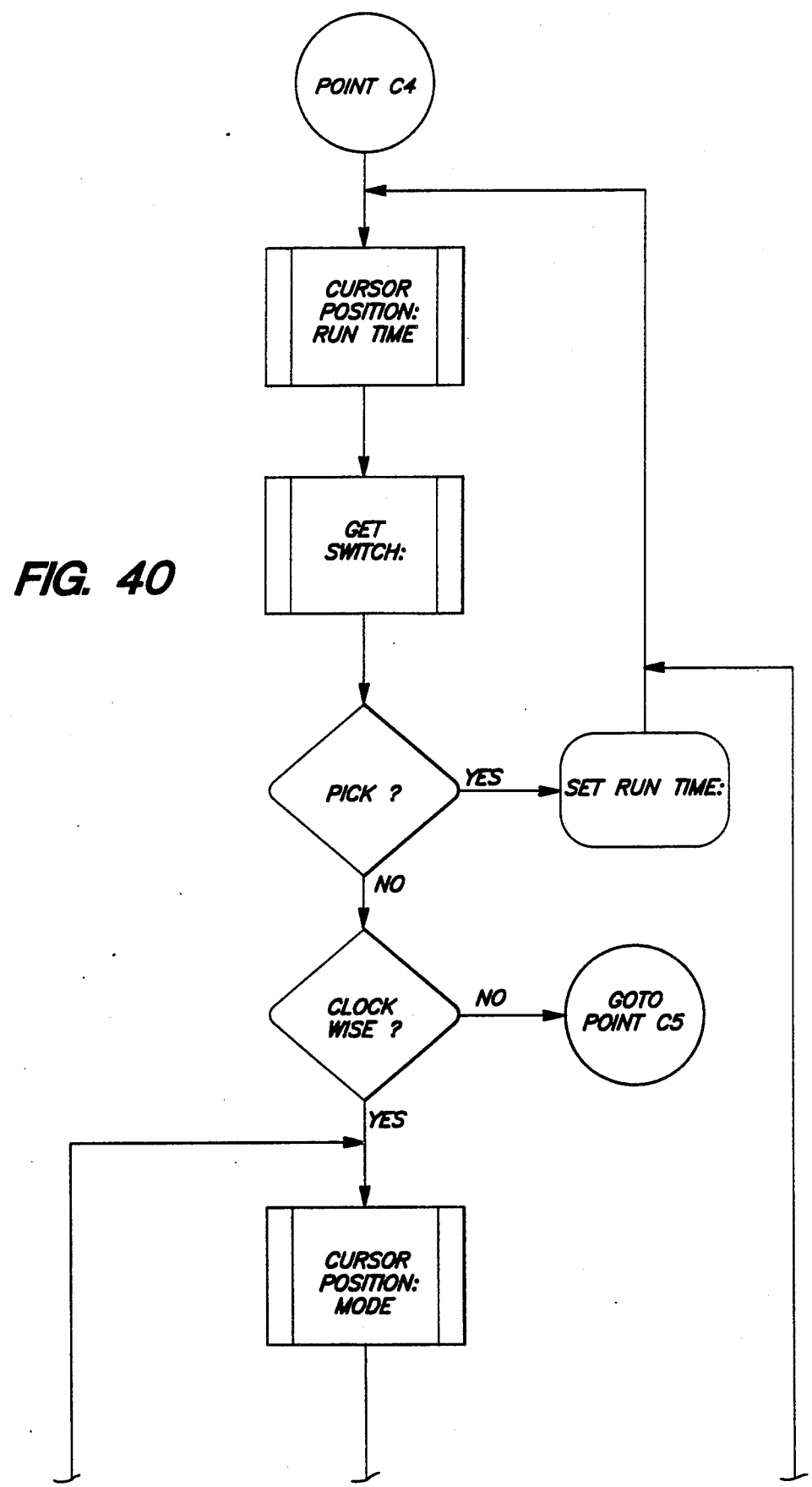
Figure 41:
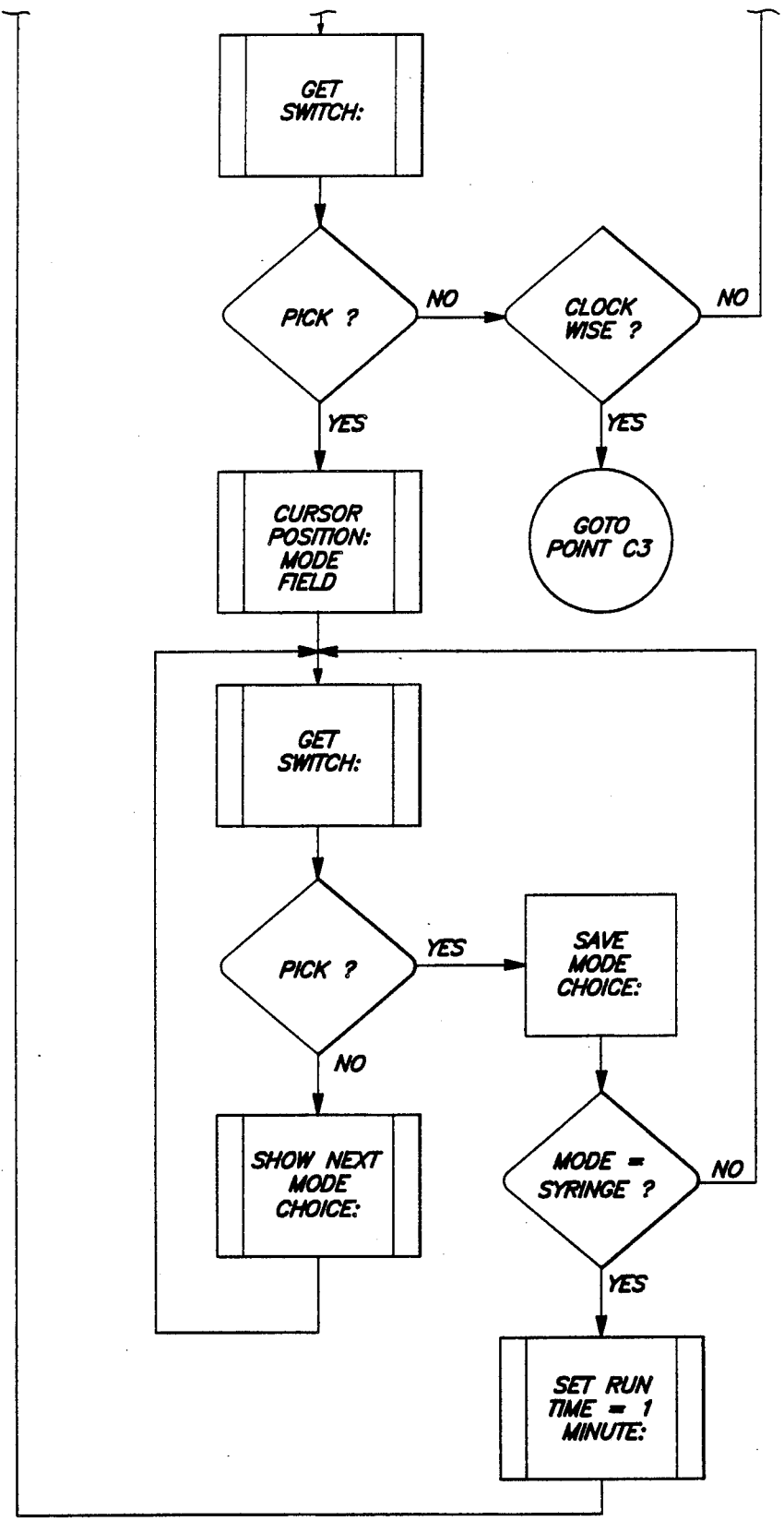
Figure 42:
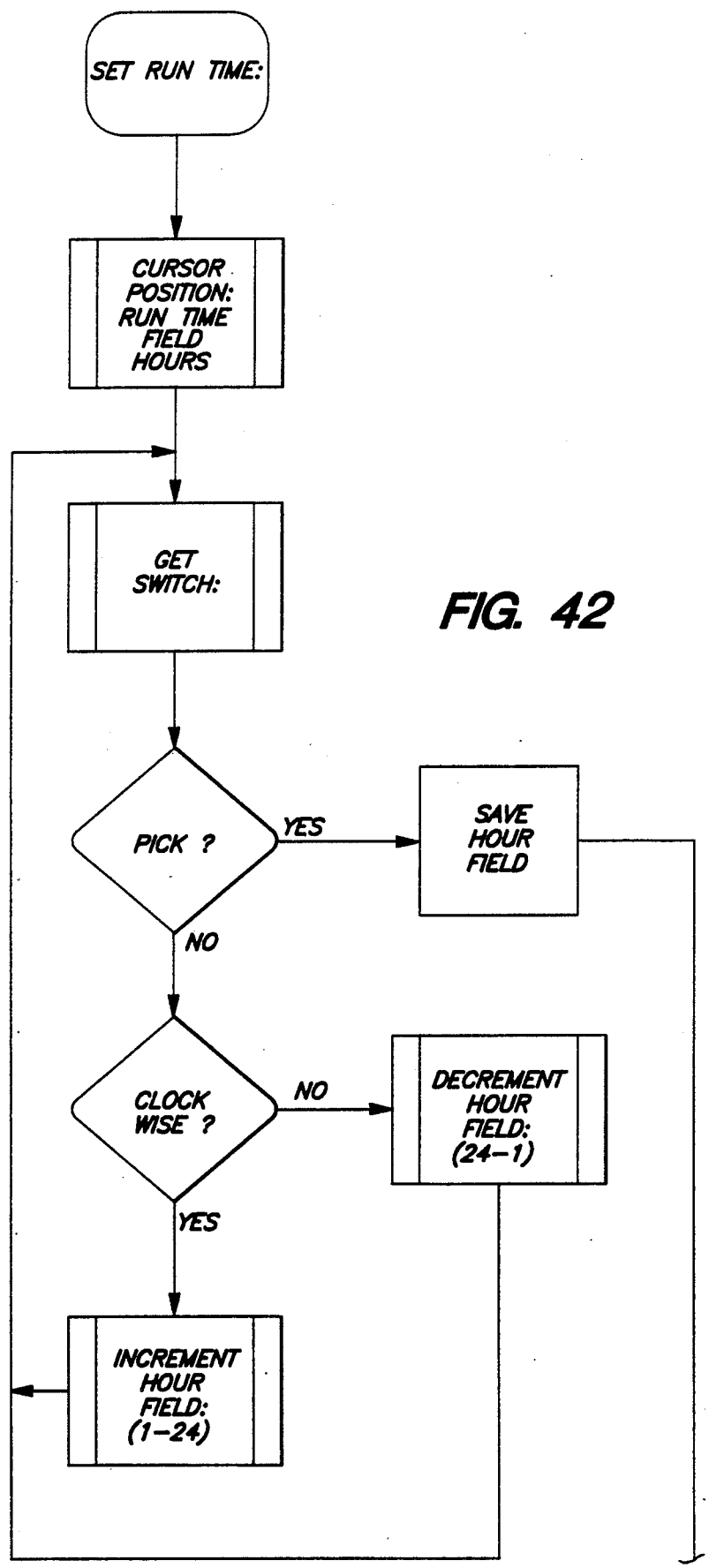
Figure 43:
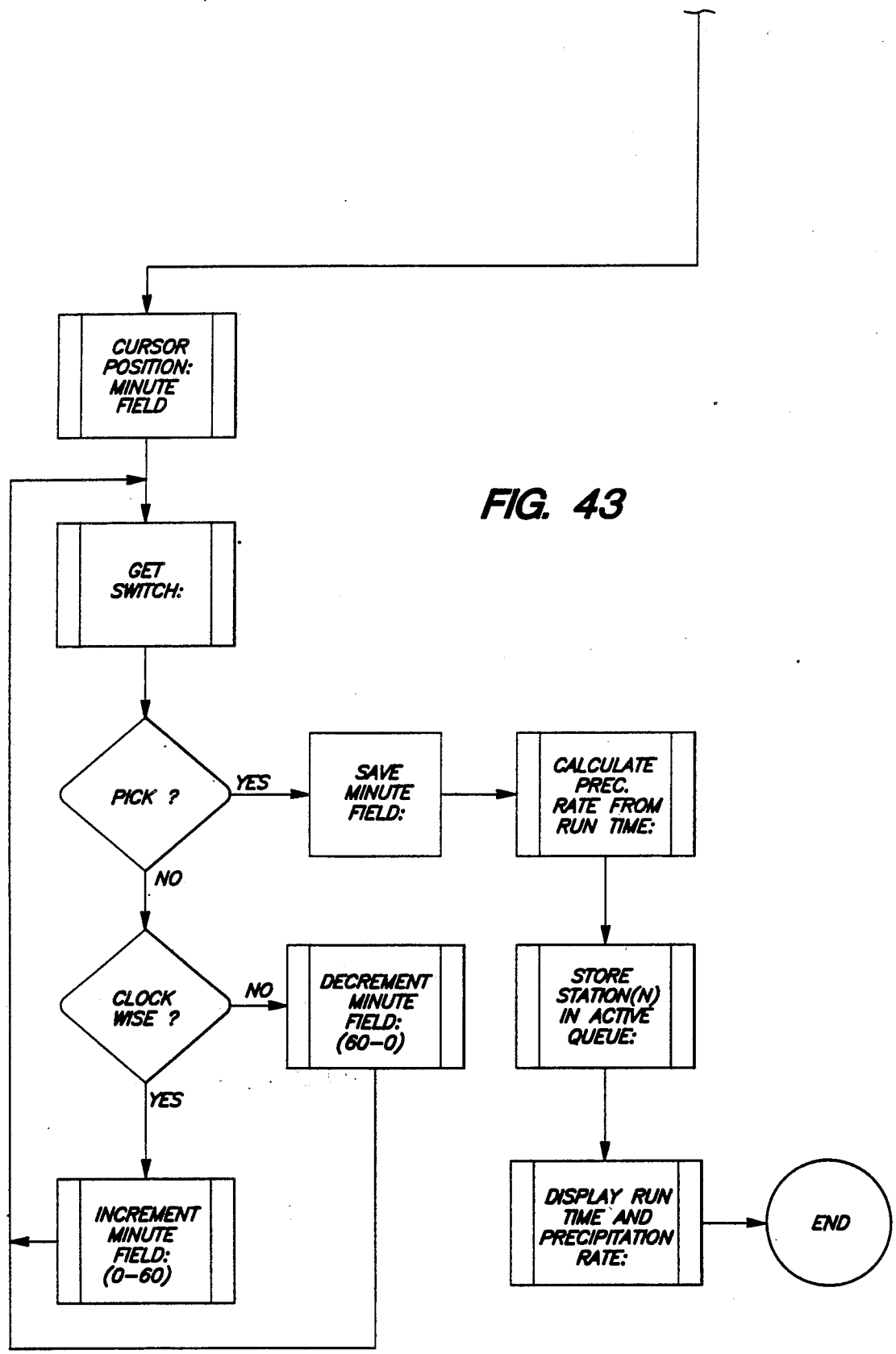
Figure 44:
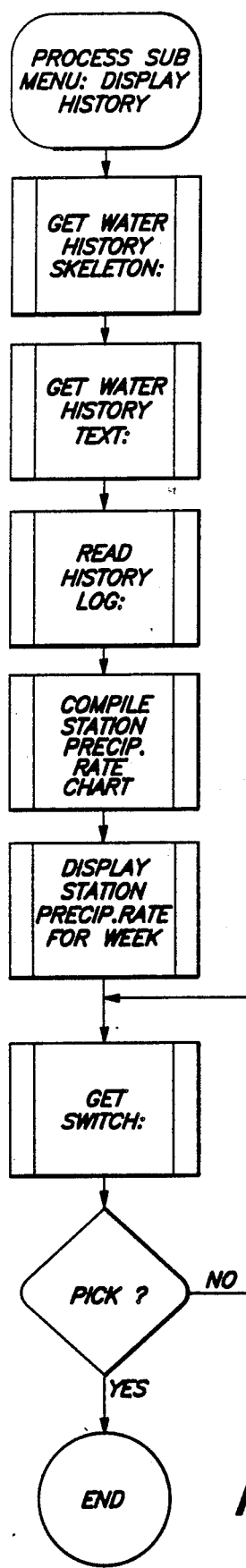
Figure 45:
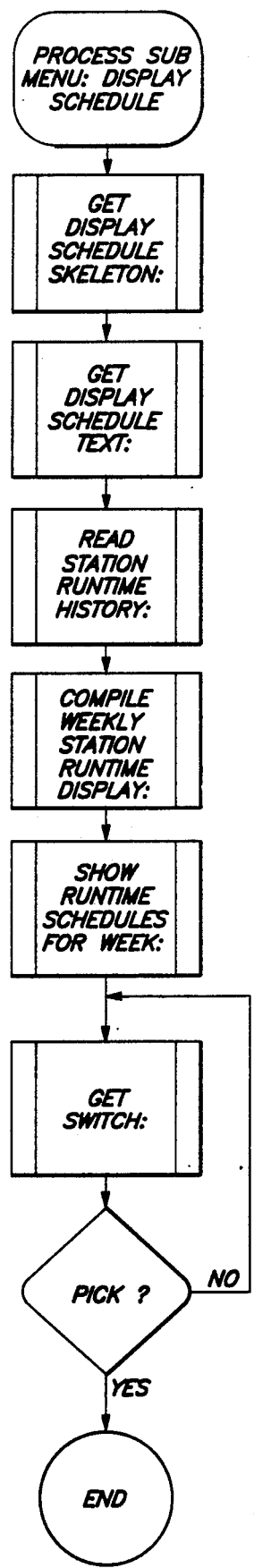
Figure 46:
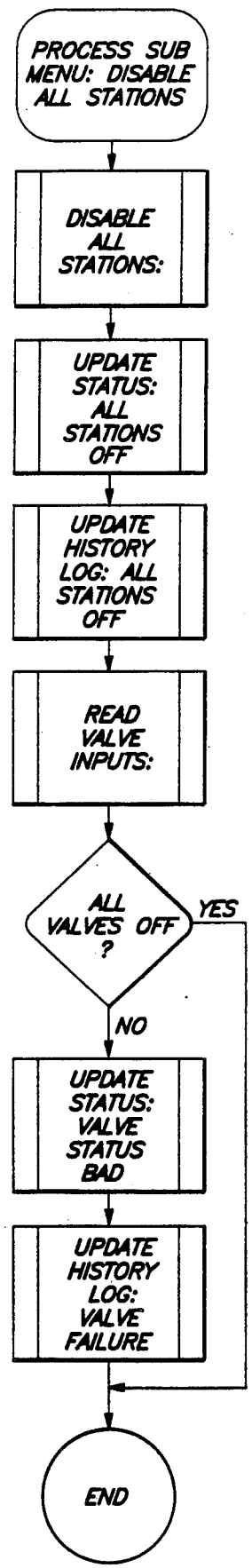

All display images reside in the video RAM 94 (FIG. 2) which is separate from the MPU memories 72 and 73. All information to be displayed is first compiled by the MPU and then transferred to the LCD control 92 on a byte for byte basis. The LCD control then formats the video RAM 94 to reflect the desired display. One full display requires 4K bytes of video memory space ( (480×64) / 8=3840). Several displays may be resident in video memory at one time. The LCD control determines which display will be shown by commands passed to it by the MPU. At least two display areas (8K bytes) are needed by the controller system to provide sophisticated user interface menus such as those illustrated in FIGS. 4-6. The user can control the LCD contrast by using a knob (not illustrated) on the front panel 54.

The front panel rotary switch 90 (FIG. 2) is both an encoded rotary switch and a momentary action push switch. The rotary action provides the MPU with information about the rotation direction and the actual switch position. The momentary push switch connected to the shaft can be detected by the MPU as a menu picking action. To the MPU the switch assembly is just another hardware device connected to the system data bus. The software of our system relates the rotary switch movements to the menu items on the display 96. This ergonomic aspect is the basis for the user interface of our control system.

The valve control logic and error checking circuit 88 (FIG. 2) both receives and transmits valve station status information to and from the MPU 70. Once the water schedules have been calculated by the MPU, the correct valve circuits must be configured. The function of the valve control is to receive a station number from the MPU and switch the correct station to ON or OFF status. ON status allows any valves connected to the output station to be switched on. The valve control 88 monitors current flow from each station and provides the MPU with constant information about each station. It can detect the number of ON status valves connected to each station as well as electrical failures in the valves or field wiring. This type of information is stored in permanent history logs which are used to manage the overall system performance. For instance, if the MPU attempts to activate a station and no response is observed as error status can be noted and displayed.

The flow charts of FIGS. 7-53 represent software procedures and subroutines which produce the various irrigation control functions heretofore described as well as the associated menu displays, examples of which are illustrated in FIGS. 3-6. The flow charts are presented in a logical order beginning from a power ON or RESET condition. This condition is represented in FIG. 3 which shows the Top Level Menu. Program flow will then be dependent upon the actions of the rotary switch. A logical progression is assumed from the Top Menu (initial setup) to disable all stations as shown in FIGS. 3 through 6.

Figure 47:
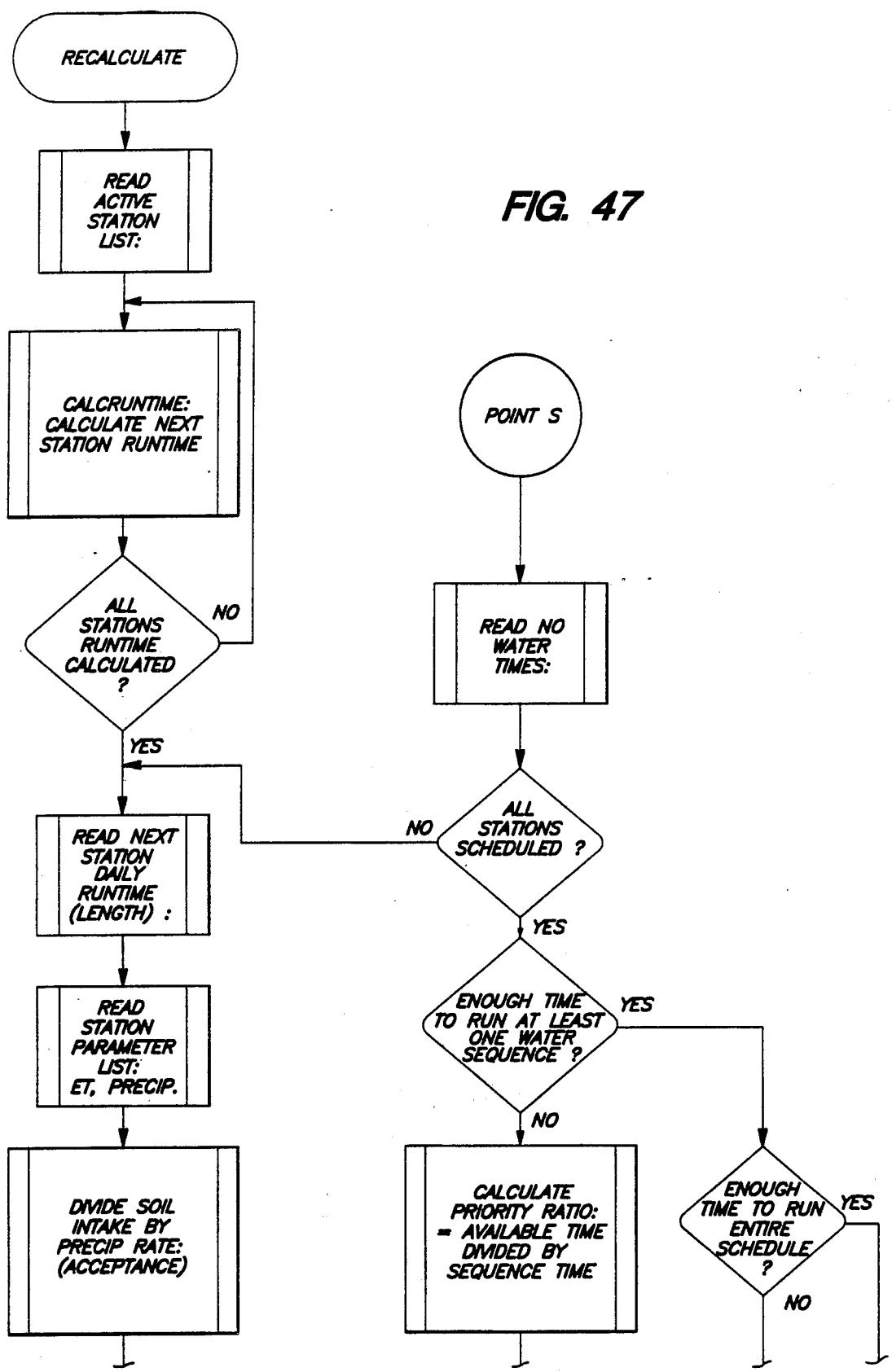
Figure 48:
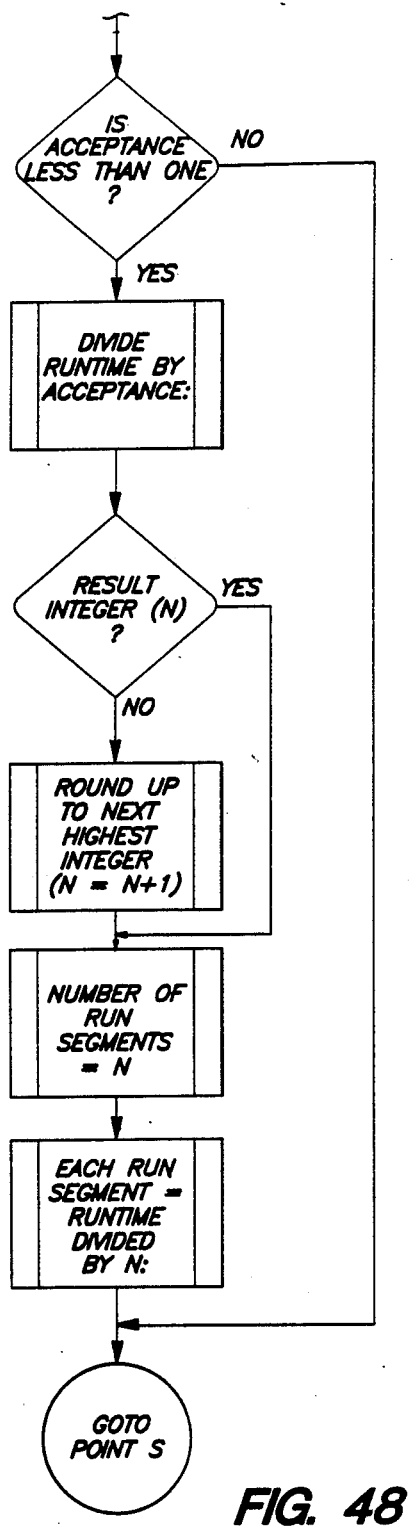
Figure 49:
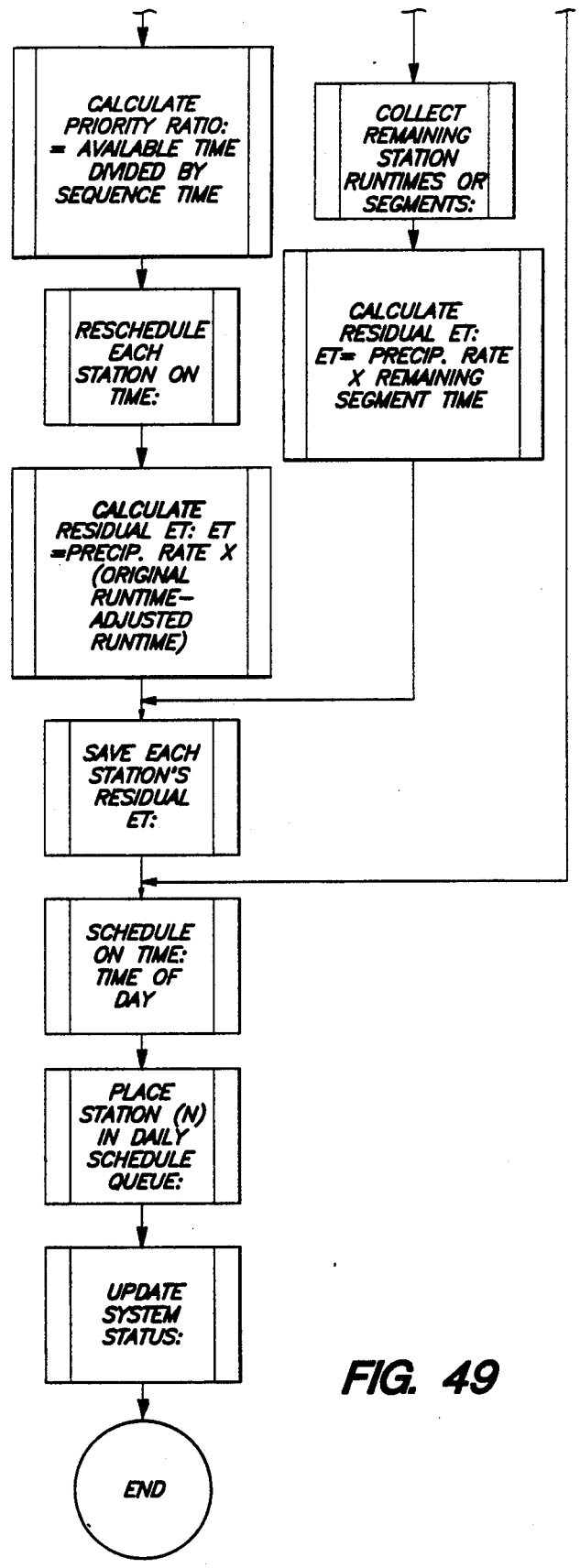
Figure 50:
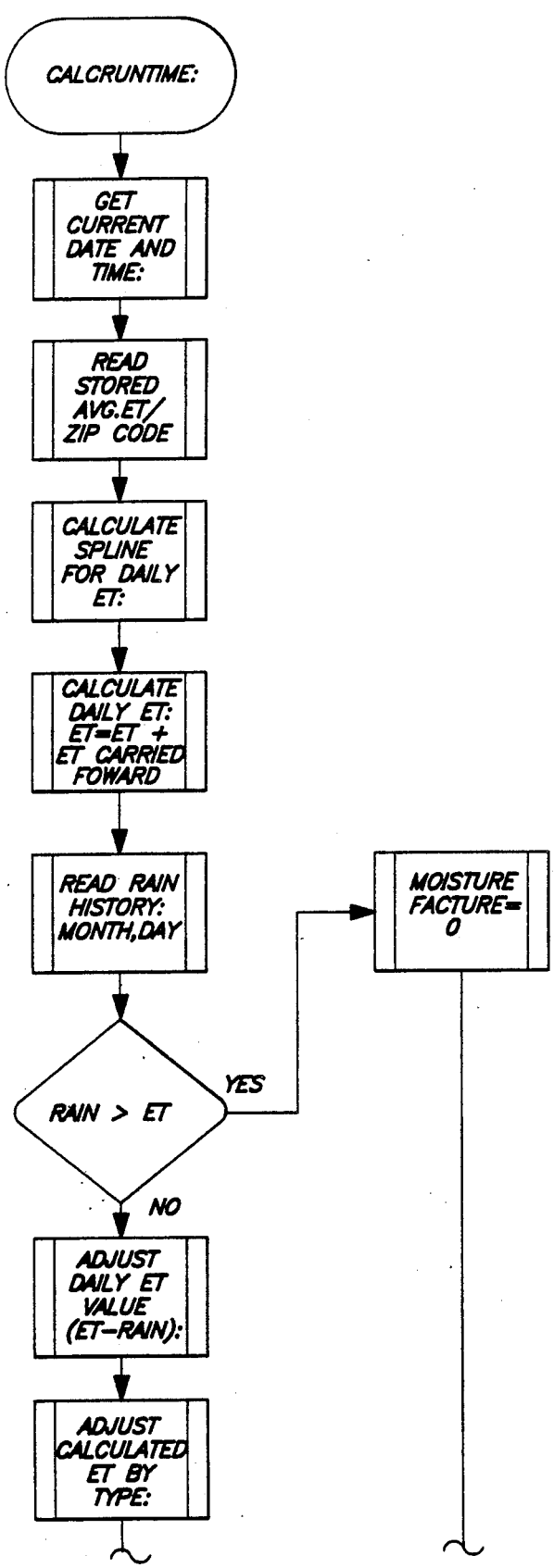
Figure 51:
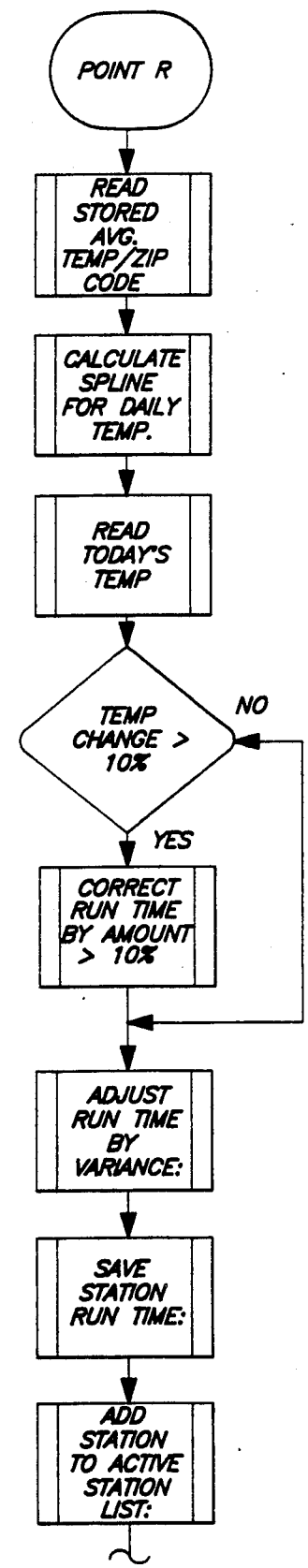
Figures 52, 53:
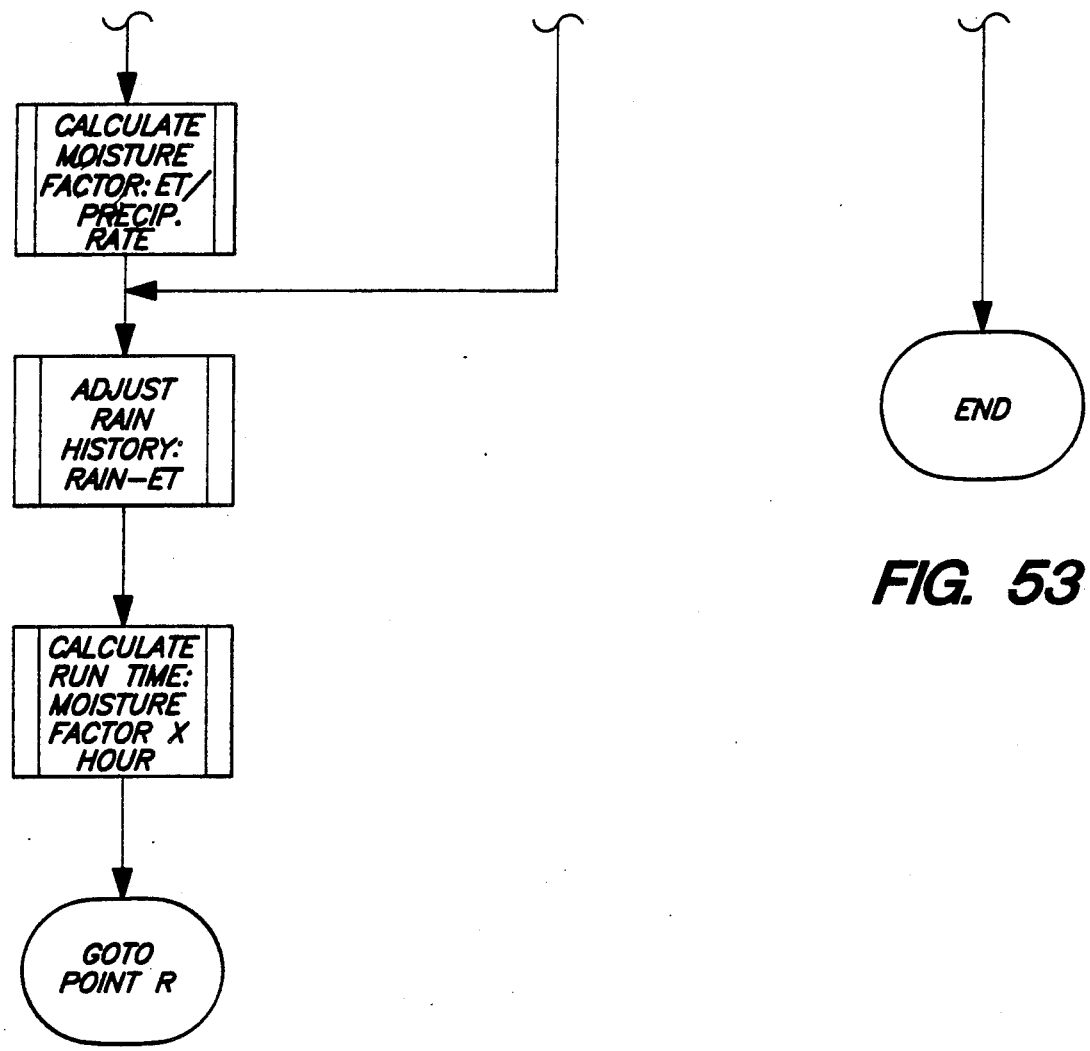

The recalculate and calculate run time flow charts are illustrated in FIGS. 47-49. The recalculate routine is periodically started by the system to insure that all water schedules are accurate in regard to any environmental or user changes which may have occurred.

The length of each station's run time is based on the stored average monthly evapotranspiration rate (ET) and mean monthly temperature for each ZIP Code area in the United States and geographical area code in foreign countries. A mathematical spline is used to determine the expected Daily value for ET and temperature valves based on vales stored for the previous and next month. The final daily value for ET is determined by subtracting any rainfall that has occurred since the previous day and adding any residual ET carried forward from the previous day. Residual ET is simply any unfulfilled moisture requirements from the previous day's water schedule.

If the value for daily rainfall is greater than the calculated ET requirement then the moisture factor (ET divided by station precipitation rate) will equal zero. However if ET is greater than the daily rainfall total, a daily moisture factor requirement is calculated and used to determine the station run time. Once the station's run time has been calculated, the temperature modifier is applied to compensate for temperature changes from normal for that date of greater than ten percent. The final run time adjustment is made by any variance entered by the user under the Station Menu illustrated in FIG. 4. At this point the station run time is saved in memory and the station is added to the active station list.

The recalculate flow charts (FIGS. 47 and 49) describes the algorithm for determining station water schedules. Each station in the active station list is given a calculated run time by calling the Calcruntime procedure. Each active station has associated with it a set of parameters such as ET, run time, soil intake rate and station precipitation rate.

If the rate that the soil can accept moisture is too low, then calculations must be made to distribute the application of the moisture in segments of time suitable to avoid water runoff. This is designated acceptance in the flow chart. The acceptance is used to divide up or segment the calculated run time into time slices. Once each station's run time or time segments are known a water schedule is performed by looking at all the available time determined by the no water time settings. Any time not designated as a no water time is available for water scheduling.

A water sequence is compiled by combining all station run times or time segments on a priority basis. The user can modify the priority or a default priority will be used starting with station number one. Several issues affect the final water schedule. It must be determined for instance, if there is enough time in the day to run at least one sequence. If too little time is available, then a reschedule routine is entered to insure that a percentage of water is applied for the available amount of time. In this case the moisture requirement for the station has not been met and a residual ET is logged for the next day.

If enough time is available to run only a portion of the entire water schedule, any remaining time segments will be recorded as residual ET as mentioned above. In the event that there is plenty of time available to run the entire water sequence, a water schedule is calculated which assigns a definite time of day for each station to switch on. The active stations are then placed in the daily schedule queue. The operating system will then control the watering activity and maintain the active station list.

While we have described in detail a preferred embodiment of our irrigation control system, it should be understood that modifications and adaptations thereof will occur to persons skilled in the art. Therefore, the protection afforded our invention should only be limited in accordance with the scope of the following claims.

We claim:

1. An irrigation method comprising the steps of:
   selecting a non-watering period for each of a plurality of water stations to thereby determine an available watering period for each of the water stations, the selection being accomplished by manual actuation of a rotary switch in conjunction with viewing of a display which indicates the data inputted by the user;
   providing data regarding location conditions; and
   activating each watering station for a predetermined duration within its corresponding available watering period based upon the location conditions.

2. An irrigation method according to claim 1 wherein the step of providing data regarding location conditions includes the step of receiving data from at least one input device selected from the group consisting of a temperature sensor, a rain gauge, a humidity sensor, and a flow meter.

3. An irrigation method according to claim 1 the step of providing data regarding location conditions includes the step of storing environmental and geographic data for later retrieval and use.

4. An irrigation method according to claim 3 wherein the environmental and geographic data includes data representing evapotranspiration rates for predetermined time intervals during a year in a predetermined geographic location.

5. An irrigation method according to claim 3 wherein the environmental and geographic data includes data representing rainfall rates for predetermined time intervals during a year in a predetermined geographic location.

6. An irrigation method according to claim 3 wherein the environmental and geographic data includes data representing both evapotranspiration rate and temperature for predetermined time intervals during a year in a predetermined geographic location.

7. An irrigation method according to claim 6 wherein the environmental and geographic data is based upon a ZIP CODE of the location where the method is to be performed.

8. An irrigation method according to claim 3 wherein the step of activating each watering station based upon the location data includes the step of dividing each predetermined duration into a series of time spaced segments in accordance with the soil intake rate in order to minimize water runoff.

9. An irrigation method according to claim 3 wherein the watering stations are activated in a predetermined priority sequence.

10. An irrigation method according to claim 1 and further comprising the steps of determining whether a power failure condition has occurred which has prevented watering and for thereafter adjusting the predetermined duration of activation of each watering station within its corresponding available watering period to compensate for non-watering during the duration of the power failure condition.

11. An irrigation method according to claim 1 wherein the step of selecting a non-watering period for each of the plurality of watering stations includes the step of generating and depicting a menu representing the selected non-watering period.

12. An irrigation method according to claim 1 and further comprising the step of selectively activating an auxiliary output device selected from the group consisting of a light, a house alarm, a household appliance and a pump.

13. An irrigation method according to claim 1 wherein the activation step includes the steps of monitoring a valve current associated with each of the watering stations and determining the existence of a faulty watering station upon the monitored valve current.

14. An irrigation method according to claim 1 wherein the activation step includes the steps of monitoring a flow meter and determining total water usage based on an output of the flow meter.

15. An irrigation method according to claim 1 and further comprising the step of adjusting the length and frequency of the predetermined watering duration for each watering station if an actual sensed temperature exceeds a calculated reference temperature by a preprogrammed amount.

16. An irrigation method according to claim 1 and further comprising the step of adjusting the length and frequency of the predetermined watering duration for each watering station based upon an expected evapotranspiration rate for given day in the location where the method is to be performed, any rainfall that has occurred since the previous day, and any unfulfilled moisture requirements from the previous day.

17. An irrigation method comprising the steps of:
   selecting a non-watering period for each of a plurality of water stations to thereby determine an available watering period for each of the water stations;
   providing data regarding location conditions including the step of storing environmental and geographic data for later retrieval and use; and
   activating each watering station for a predetermined duration within its corresponding available watering period based upon the location conditions.

18. An irrigation method according to claim 17 wherein the environmental and geographic data includes data representing evapotranspiration rates for predetermined time intervals during a year in a predetermined geographic location.

19. An irrigation method according to claim 17 wherein the environmental and geographic data includes data representing rainfall rates for predetermined time intervals during a year in a predetermined geographic location.

20. An irrigation method according to claim 17 wherein the environmental and geographic data includes data representing both evapotranspiration rates and temperature for predetermined time intervals during a year in a predetermined geographic location.

21. An irrigation method according to claim 17 wherein the step of activating each watering station based upon the location data includes the step of dividing each predetermined duration into a series of time spaced segments in accordance with the soil intake rate in order to minimize water runoff.

22. An irrigation method according to claim 17 wherein the watering stations are activated in a predetermined priority sequence.

23. An irrigation method comprising the steps of:

selecting a non-watering period for each of a plurality of water stations to thereby determine an available watering period for each of the water stations;

providing data regarding location conditions;

activating each watering station for a predetermined duration within its corresponding available watering period based upon the location conditions; and determining whether a power failure condition has occurred which has prevented watering and thereafter adjusting the predetermined duration of activation of each watering station within its corresponding available watering period to compensate for non-watering during the duration of the power failure condition.

24. An irrigation method comprising the steps of:

selecting a non-watering period for each of a plurality of water stations to thereby determine an available watering period for each of the water stations, including the step of generating and depicting a menu representing the selected non-watering periods;

providing data regarding location conditions; and activating each watering station for a predetermined duration within its corresponding available watering period based upon the location conditions.

25. An irrigation method comprising the steps of:

selecting a non-watering period for each of a plurality of water stations to thereby determine an available watering period for each of the water stations;

providing data regarding location conditions including the step of storing environmental and geographic data for later retrieval and use, the environmental and geographic data including data representing both evapotranspiration rate and temperature for predetermined time intervals during a year in a predetermined geographic location based upon a ZIP CODE of the location where the method is to be performed; and activating each watering station for a predetermined duration within its corresponding available watering period based upon the location conditions.

26. An irrigation method comprising the steps of:

selecting a non-watering period for each of a plurality of water stations to thereby determine an available watering period for each of the water stations;

providing data regarding location conditions;

activating each watering station for a predetermined duration within its corresponding available watering period based upon the location conditions; and adjusting the length and frequency of the predetermined watering duration for each watering station based upon an expected evapotranspiration rate for a given day at the location where the method is to be performed, any rainfall that has occurred since the previous day, and any unfulfilled moisture requirements from the previous day.

27. An irrigation method comprising the steps of:

providing a plurality of selectively actuable watering stations about a selected location;

connecting each of the watering stations to a source of pressurized water;

storing a set of data representing environmental conditions of the selected location, said conditions being selected from the group consisting of evapotranspiration rate for predetermined intervals throughout a given time period and temperature for predetermined intervals throughout a given time period;

providing data from at least one input device at the selected location, the input device being selected from the group consisting of a temperature sensor, a rain gauge, a humidity sensor, and a flow meter; and actuating each watering station for predetermined durations at predetermined intervals based upon the data representing environmental conditions and the input device data to thereby ensure optimum growth of the plants situated in the selected location.

28. A method according to claim 27 and further comprising the steps of:

selecting a non-watering period for each of the watering stations to thereby determine an available watering period for each of the watering stations; and actuating each watering station only within its corresponding available watering period.

29. An irrigation control system, comprising:

means for enabling a user to input data representing a non-watering period for each of a plurality of watering stations to thereby determine an available watering period for each of the watering stations including a rotary switch and display means for indicating the data inputted by the user;

means for providing data regarding location conditions; and means for automatically activating each watering station for a predetermined duration within its corresponding available watering period based upon the location conditions.

30. An irrigation control system according to claim 29 wherein the means for providing data regarding location conditions includes at least one input device selected from the group consisting of a temperature sensor, a rain gauge, a humidity sensor, and a flow meter.

31. An irrigation control system according to claim 29 wherein the means for providing data regarding location conditions includes memory means for storing environmental and geographic data.

32. An irrigation control system according to claim 31 wherein the environmental and geographic data includes data representing evapotranspiration rates for predetermined time intervals during a year in a predetermined geographic location.

33. An irrigation control system according to claim 31 wherein the environmental and geographic data includes data representing temperature for predetermined time intervals during a year in a predetermined geographic location.

34. An irrigation control system according to claim 29 and further comprising means selectively activating an auxiliary output device selected from the group consisting of a light, a house alarm, a household appliance and a pump.

35. An irrigation control system according to claim 29 wherein the means for automatically activating each watering station includes means for detecting a power failure condition and for thereafter automatically adjusting the predetermined duration of activation of each watering station within its corresponding available watering period to compensate for non-watering during the duration of the power failure condition.

36. An irrigation control system according to claim 29 wherein the display means includes means for generating and depicting a series of menus representing the inputted data.

37. An irrigation control system, comprising:
means for enabling a user to input data representing a non-watering period for each of a plurality of watering stations to thereby determine an available watering period for each of the watering stations;
means for providing data regarding location conditions;
means for automatically activating each watering station for a predetermined duration within its corresponding available watering period based upon the location conditions, including means for detecting a power failure condition and for thereafter automatically adjusting the predetermined duration of activation of each watering station within its corresponding available watering period to compensate for non-watering during the duration of the power failure condition.

* * * * *